United States Patent
Ito et al.

(10) Patent No.: US 10,078,393 B2
(45) Date of Patent: Sep. 18, 2018

(54) TOUCH DETECTION DEVICE, DISPLAY DEVICE WITH TOUCH DETECTION FUNCTION, AND COVER MEMBER

(71) Applicant: Japan Display Inc., Tokyo (JP)

(72) Inventors: Daisuke Ito, Tokyo (JP); Toshihiko Fujiwara, Tokyo (JP); Hayato Kurasawa, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 85 days.

(21) Appl. No.: 15/170,136

(22) Filed: Jun. 1, 2016

(65) Prior Publication Data

US 2016/0357321 A1    Dec. 8, 2016

(30) Foreign Application Priority Data

Jun. 5, 2015 (JP) ................................ 2015-115220

(51) Int. Cl.
| | | |
|---|---|---|
| *G06F 3/041* | (2006.01) | |
| *G06F 3/044* | (2006.01) | |
| *G09G 3/20* | (2006.01) | |
| *G09G 3/36* | (2006.01) | |

(52) U.S. Cl.
CPC ............ *G06F 3/0416* (2013.01); *G06F 3/044* (2013.01); *G06F 3/0412* (2013.01); *G09G 3/20* (2013.01); *G09G 3/36* (2013.01); *G09G 2310/0202* (2013.01)

(58) Field of Classification Search
None
See application file for complete search history.

(56) References Cited

U.S. PATENT DOCUMENTS

| | | | |
|---|---|---|---|
| 9,323,384 B2 * | 4/2016 | Kim | G06F 3/0416 |
| 2012/0249446 A1 * | 10/2012 | Chen | G06F 3/044 345/173 |
| 2012/0262390 A1 * | 10/2012 | Kida | G06F 3/0412 345/173 |
| 2014/0253501 A1 | 9/2014 | Noguchi et al. | |
| 2015/0004369 A1 | 1/2015 | Eby et al. | |

FOREIGN PATENT DOCUMENTS

JP    2014174760    3/2013

* cited by examiner

*Primary Examiner* — Duane N Taylor, Jr.
(74) *Attorney, Agent, or Firm* — K&L Gates LLP

(57) ABSTRACT

A touch detection device includes a substrate, a plurality of drive electrodes arranged on a plane parallel to the substrate and in a first region in which an image is displayed, and a plurality of touch detection electrodes configured to generate a capacitance between the touch detection electrodes and the drive electrodes. At least one touch detection electrode among the touch detection electrodes includes a first part arranged in the first region and a second part arranged in a second region adjacent to the first region. The drive electrodes are sequentially supplied with the first drive signal to detect a conducting body in contact with or close to the first region in a first touch detection mode, and the touch detection electrodes are supplied with a second drive signal to detect a conducting body in contact with or close to the second region in a second touch detection mode.

12 Claims, 23 Drawing Sheets

TOUCH DETECTION DEVICE, DISPLAY DEVICE WITH TOUCH DETECTION FUNCTION, AND COVER MEMBER

CROSS-REFERENCE TO RELATED APPLICATIONS

This application claims priority from Japanese Application No. 2015-115220, filed on Jun. 5, 2015, the contents of which are incorporated by reference herein in its entirety.

BACKGROUND

1. Technical Field

The present disclosure relates to a touch detection device, a display device with a touch detection function, and a cover member.

2. Description of the Related Art

A touch detection device called a touch panel that is capable of detecting an external proximity object has recently been attracting attention. The touch panel is used in a display device with a touch detection function such that the touch panel is mounted on or integrated with a display device such as a liquid crystal display device. The display device with a touch detection function displays, for example, various button images on the display device, using the touch panel in place of normal mechanical buttons to receive an information input.

Japanese Patent Application Laid-open Publication No. 2014-174760 (JP-A-2014-174760) discloses a display device with a touch detection function in which a button through which a zero-dimensional (0D; on and off) input is performed is provided outside of a display region. The display device with a touch detection function disclosed in JP-A-2014-174760 includes a touch detection electrode extending from the display region to the outside of the display region, and a drive electrode that is capacitively coupled with the touch detection electrode outside of the display region. A touch input on the button is detected based on a change in mutual capacitance of the touch detection electrode and the drive electrode outside of the display region.

The display device with a touch detection function disclosed in JP-A-2014-174760 needs to provide the drive electrode that is capacitively coupled with the touch detection electrode outside of the display region, potentially complicating the device.

SUMMARY

According to an aspect, a touch detection device includes a substrate, a plurality of drive electrodes arranged on a plane parallel to the substrate and in a first region in which an image is displayed, and a plurality of touch detection electrodes configured to generate a capacitance between the touch detection electrodes and the drive electrodes. At least one touch detection electrode among the touch detection electrodes includes a first part arranged in the first region and a second part arranged in a second region adjacent to the first region. The drive electrodes are sequentially supplied with the first drive signal to detect a conducting body in contact with or close to the first region in a first touch detection mode, and the touch detection electrodes are supplied with a second drive signal to detect a conducting body in contact with or close to the second region in a second touch detection mode.

According to another aspect, a touch detection device includes a substrate, a plurality of drive electrodes arranged on a plane parallel to the substrate and in a first region in which an image is displayed, and a plurality of touch detection electrodes configured to generate a capacitance between the touch detection electrodes and the drive electrodes. At least one drive electrode among the drive electrodes includes a first part arranged in the first region and a second part arranged in a second region adjacent to the first region. The drive electrodes are sequentially supplied with a first drive signal to detect a conducting body in contact with or close to the first region in a first touch detection mode. The drive electrodes are supplied with a second drive signal to detect a conducting body in contact with or close to the second region in a second touch detection mode.

According to another aspect, a touch detection device includes a substrate, a plurality of drive electrodes arranged on a plane parallel to the substrate and in a first region in which an image is displayed, and a plurality of touch detection electrodes configured to generate a capacitance between the touch detection electrodes and the drive electrodes. A conducting body in contact with or close to the first region is detected based on a mutual capacitance between the touch detection electrodes and the drive electrodes in a first touch detection mode. A conducting body in contact with or close to a second region adjacent to the first region is detected based on a self-capacitance of the touch detection electrodes or the drive electrodes in a second touch detection mode.

According to another aspect, a display device with a touch detection function includes a touch detection device, a plurality of pixel electrodes arranged in a matrix facing the drive electrodes in the first region on the plane parallel to the substrate, and a display function layer having an image display function in the first region.

According to another aspect, a cover member is arranged on a surface of a touch detection device including a substrate, a plurality of drive electrodes arranged on a plane parallel to the substrate and in a first region in which an image is displayed, and a plurality of touch detection electrodes configured to generate a capacitance between the touch detection electrodes and the drive electrodes. At least one touch detection electrode among the touch detection electrodes includes a first part arranged in the first region and a second part arranged in a second region adjacent to the first region. The cover member includes a cover substrate, and an overlapping electrode arranged at a position of the second part of the at least one touch detection electrode in a plan view on a plane parallel to the cover substrate.

DETAILED DESCRIPTION

Figure 1:
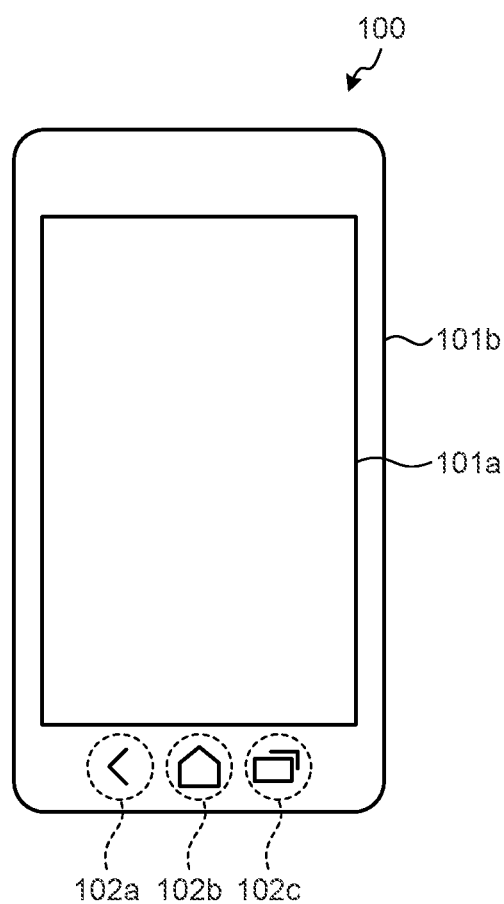
FIG. 1 illustrates the appearance of a smartphone to which a display device with a touch detection function according to a first embodiment of the present invention is applied.

Exemplary aspects (embodiments) according to the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The accompanying drawings may possibly illustrate the width, the thickness, the shape, and other elements of each unit more schematically than the actual aspect to simplify the explanation. These elements, however, are given by way of example only and are not intended to limit interpretation of the invention. In the specification and the accompanying drawings, components similar to those previously described with reference to a preceding drawing are denoted by like reference numerals and symbols, and overlapping explanation thereof will be appropriately omitted.

First Embodiment

FIG. 1 illustrates the appearance of a smartphone to which a display device with a touch detection function according to a first embodiment of the present invention is applied. As illustrated in FIG. 1, a smartphone 100 includes a display region 101a and a frame region 101b. The display region 101a can display, for example, an image and text, and perform two-dimensional (2D) touch detection. The display region 101a also serves as a touch detection region. The frame region 101b is provided adjacently to the display region 101a so as to surround the display region 101a. In the frame region 101b, 0D buttons (hereinafter simply referred to as a "button") 102a to 102c capable of zero-dimensional (0D; on and off) touch detection are arranged. For example, the button 102a is a "back button" for displaying a previous screen, the button 102b is a "home button" for displaying a home screen, and the button 102c is a "menu button" for displaying a menu screen. Image display and touch detection on the display region 101a are achieved by a display device with a touch detection function according to the present embodiment to be described below. Touch detection on the buttons 102a to 102c is also achieved by the display device with a touch detection function according to the present embodiment to be described below.

The 2D touch detection refers to determination of the coordinates of a touch position, and the 0D touch detection refers to determination of whether there is a touch. The number of buttons is not limited to three of the buttons 102a, 102b, and 102c, and may be one or two, or four or more. The buttons 102a, 102b, and 102c are arranged in the frame region 101b below the display region 101a in FIG. 1, but may be arranged above, left to, or right to the display region 101a.

Figure 2:
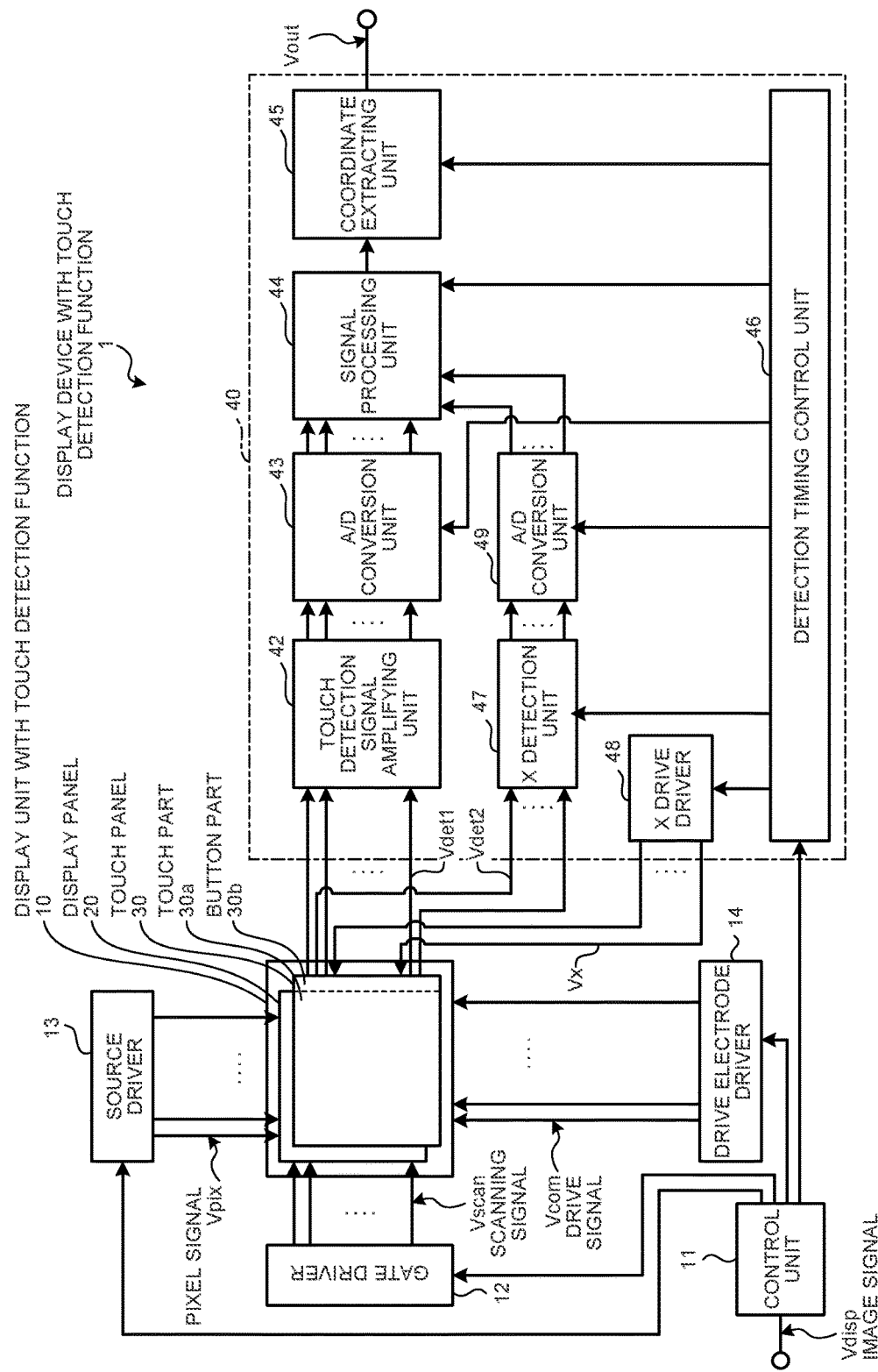
FIG. 2 is a block diagram illustrating an exemplary configuration of the display device with a touch detection function according to the first embodiment.

FIG. 2 is a block diagram illustrating an exemplary configuration of the display device with a touch detection function according to the first embodiment. The display device 1 with a touch detection function includes a display unit 10 with a touch detection function, a control unit 11, a gate driver 12, a source driver 13, a drive electrode driver 14, and a touch detection unit 40. The display device 1 with a touch detection function is a display device that includes the display unit 10 incorporating a touch detection function. The display unit 10 with a touch detection function is a device in which a display panel 20 including a liquid crystal display element as a display element is integrated with a touch panel 30 as a touch detection device that detects a touch input. The display unit 10 with a touch detection function may be what is called an on-cell device in which the touch panel 30 is mounted on the display panel 20. The display panel 20 may be an organic EL display panel, for example.

The gate driver 12 has a function to sequentially select one horizontal line to be a target of display drive in the display unit 10 with a touch detection function based on a control signal supplied from the control unit 11.

The source driver 13 is a circuit that supplies pixel signals Vpix to sub-pixels SPix, which will be described below, of the display unit 10 with a touch detection function based on a control signal supplied from the control unit 11.

The drive electrode driver 14 is a circuit that supplies a first drive signal Vcom to the drive electrodes COML, which will be described below, of the display unit 10 with a touch detection function based on a control signal supplied from the control unit 11.

The display panel 20 is a display element that sequentially scans one horizontal line based on a scanning signal Vscan supplied from the gate driver 12, thereby performing display, which will be described below. The control unit 11 is a circuit that supplies the control signals to the gate driver 12, the source driver 13, the drive electrode driver 14, and the touch detection unit 40 based on video signals Vdisp supplied from the outside, thereby performing control such that these components operate in synchronization with one another.

The touch panel 30 includes a touch part 30a that performs the 2D touch detection, and a button part 30b that performs the 0D touch detection. The touch part 30a overlaps a display region of the display panel 20 in a plan view (in a direction perpendicular to the main surface of the display unit 10 with a touch detection function). The button part 30b is arranged adjacent to the touch part 30a, and is arranged out of the display region of the display panel 20 such as on a frame region, in a plan view.

The touch panel 30 operates based on the basic principle of capacitive touch detection, and has a first touch detection mode for performing mutual capacitive touch detection, and a second touch detection mode for performing self-capacitive touch detection. Any touch input on the touch part 30a is detected in the first touch detection mode (mutual capacitive touch detection), whereas any touch input on the button part 30b is detected in the second touch detection mode (self-capacitive touch detection).

In response to a touch input on the touch part 30a, the touch panel 30 outputs a first touch detection signal Vdet1, which is then supplied to the touch detection unit 40. In response to a touch input on the button part 30b, the touch panel 30 outputs a second touch detection signal Vdet2, which is then supplied to the touch detection unit 40.

The touch detection unit 40 is a circuit that detects any touch on the touch panel 30 based on the control signal supplied from the control unit 11, and the first touch detection signal Vdet1 and the second touch detection signal Vdet2 supplied from the touch panel 30. In response to a touch, the touch detection unit 40 calculates the coordinates of the touch on the touch part 30a, for example. The touch detection unit 40 includes a touch detection signal amplifying unit 42, an A/D conversion unit 43, a signal processing unit 44, a coordinate extracting unit 45, and a detection timing control unit 46. The touch detection unit 40 further includes an X detection unit 47, a TDL driver 48, and an A/D conversion unit 49.

Figure 3:
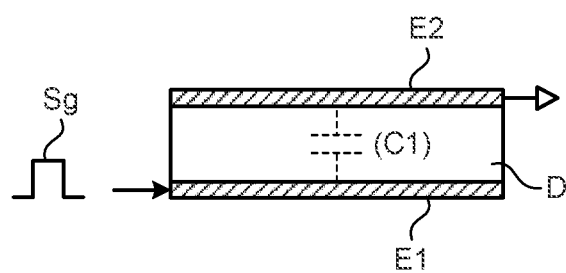
FIG. 3 is a diagram for explaining the basic principle of mutual capacitive touch detection, illustrating a state in which a finger is not in contact with or close to a device.
Figure 4:
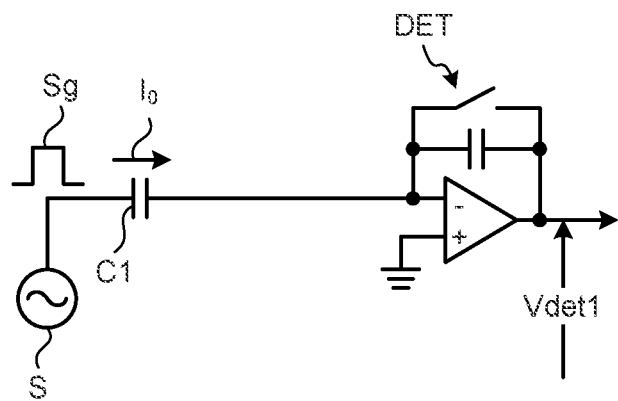
FIG. 4 is a diagram illustrating an equivalent circuit of the state illustrated in FIG. 3 in which the finger is not in contact with or close to the device.
Figure 5:
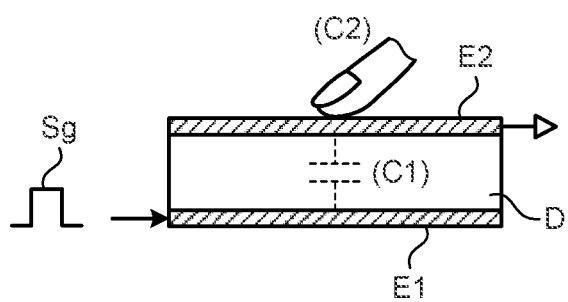
FIG. 5 is a diagram for explaining the basic principle of mutual capacitive touch detection, illustrating a state in which a finger is in contact with or close to a device.
Figure 6:
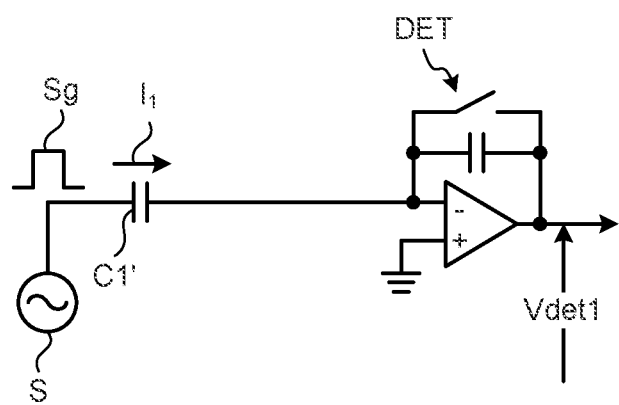
FIG. 6 is a diagram illustrating an equivalent circuit of the state illustrated in FIG. 5 in which the finger is in contact with or close to the device.
Figure 7:
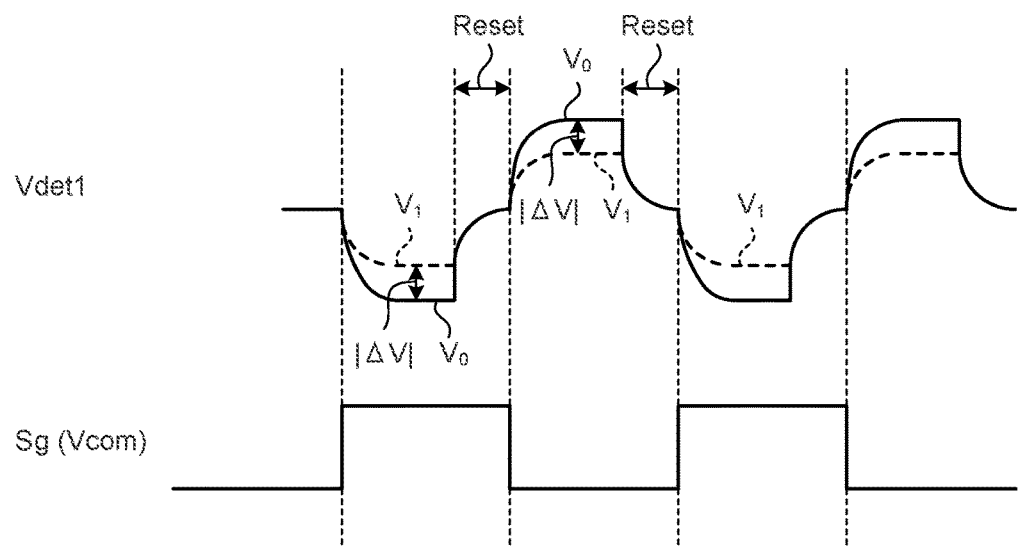
FIG. 7 is a diagram illustrating exemplary waveforms of a drive signal and a touch detection signal in mutual capacitive touch detection.

As described above, the touch panel 30 operates based on the basic principle of capacitive touch detection. The following describes the basic principle of mutual-capacitive touch detection in the first touch detection mode performed by the display device 1 with a touch detection function according to the present embodiment with reference to FIGS. 3 to 7. FIG. 3 is a diagram for explaining the basic principle of mutual-capacitive touch detection and illustrates a state where a finger is not in contact with or in proximity to a device. FIG. 4 is a diagram illustrating an example of an equivalent circuit in the state where the finger is not in contact with or in proximity to the device as illustrated in FIG. 3. FIG. 5 is a diagram for explaining the basic principle of mutual-capacitive touch detection and illustrates a state where a finger is in contact with or in proximity to a device. FIG. 6 is a diagram illustrating an example of the equivalent circuit in the state where the finger is in contact with or in proximity to the device as illustrated in FIG. 5. FIG. 7 is a diagram illustrating an example of waveforms of a drive signal and a touch detection signal. While the following describes a case where a finger is in contact with or in proximity to the device, the external proximity object is not limited to a finger and may be a device, such as a stylus including a conducting body.

As illustrated in FIG. 3, for example, a capacitive element C1 includes a pair of electrodes, i.e., a drive electrode E1 and a touch detection electrode E2 that are arranged facing each other with a dielectric D interposed therebetween. As illustrated in FIG. 4, one end of the capacitive element C1 is coupled to an alternating-current (AC) signal source (drive signal source) S, whereas the other end thereof is coupled to a voltage detector (touch detection unit) DET. The voltage detector DET is an integration circuit included in the touch detection signal amplifying unit 42 illustrated in FIG. 2, for example.

When an AC signal source S applies an AC rectangular wave Sg at a predetermined frequency (e.g., approximately several kilohertz to several hundred kilohertz) to the drive electrode E1 (one end of the capacitive element C1), an output waveform (first touch detection signal Vdet1) illustrated in FIG. 7 is generated via the voltage detector DET coupled to the touch detection electrode E2 (the other end of the capacitive element C1). The AC rectangular wave Sg corresponds to the first drive signal Vcom transmitted from the drive electrode driver 14.

In a state where a finger is not in contact with (or in proximity to) the device (non-contact state), electric current $I_0$ depending on the capacitance value of the capacitive element C1 flows in association with charge and discharge of the capacitive element C1 as illustrated in FIGS. 3 and 4. The voltage detector DET illustrated in FIG. 4 converts fluctuations in the electric current $I_0$ depending on the AC rectangular wave Sg into fluctuations in the voltage (waveform $V_0$ indicated by the solid line illustrated in FIG. 7).

On the other hand, in a state where a finger is in contact with (or in proximity to) the device (contact state), capacitance C2 generated by the finger is in contact with or in proximity to the touch detection electrode E2 as illustrated in FIG. 5. As a result, the capacitance C2 blocks capacitance of a fringe between the drive electrode E1 and the touch detection electrode E2, thereby providing a capacitive element C1' having a capacitance value smaller than that of the capacitive element C1 As illustrated in the equivalent circuit in FIG. 6, electric current $I_1$ flows through the capacitive element C1'. Subsequently, as illustrated in FIG. 7, the voltage detector DET converts fluctuations in the electric current $I_1$ depending on the AC rectangular wave Sg into fluctuations in the voltage (waveform $V_1$ indicated by the dotted line). In this case, the waveform $V_1$ has amplitude smaller than that of the waveform $V_0$ described above. As a result, an absolute value $|\Delta V|$ of the voltage difference between the waveform $V_0$ and the waveform $V_1$ varies depending on influence of a conducting body, such as a finger, approaching the device from the outside. To accurately detect the absolute value $|\Delta V|$ of the voltage difference between the waveform $V_0$ and the waveform $V_1$, the voltage detector DET preferably operates while having a period Reset for resetting charge and discharge of a capacitor in accordance with the frequency of the AC rectangular wave Sg by switching in the circuit.

The touch panel 30 illustrated in FIG. 2 performs mutual capacitive touch detection on the touch part 30a by sequentially scanning each detection block in accordance with the first drive signal Vcom supplied from the drive electrode driver 14.

In the touch panel 30, the first touch detection signals Vdet1 are output from a plurality of touch detection electrodes TDL to be described below through the voltage detector DET illustrated in FIG. 4 or 6 for each detection block, and are supplied to the touch detection signal amplifying unit 42 of the touch detection unit 40.

The touch detection signal amplifying unit 42 amplifies the first touch detection signal Vdet1 supplied from the touch panel 30 upon mutual capacitive touch detection. The touch detection signal amplifying unit 42 may include an analog low-pass filter (LPF) that outputs a signal by removing a high frequency component (noise component) included in the first touch detection signal Vdet1.

The A/D conversion unit 43 samples each analog signal output from the touch detection signal amplifying unit 42 at timing in synchronization with the first drive signal Vcom, and converts the analog signal into a digital signal.

The signal processing unit 44 includes a digital filter that reduces a frequency component (noise component) other than the frequency of sampling the first drive signal Vcom, which is included in an output signal from the A/D conversion unit 43. The signal processing unit 44 is a logic circuit that detects any touch on the touch panel 30 based on the output signal from the A/D conversion unit 43. The signal processing unit 44 performs processing to extract only a difference in a detection signal generated by a finger. This difference signal generated by a finger is the absolute value $|\Delta V|$ of the difference between the waveform V0 and the waveform V1 described above. The signal processing unit 44 may obtain the average value of the absolute values $|\Delta V|$ by calculating the average of the absolute values $|\Delta V|$ per detection block. Accordingly, the signal processing unit 44 can reduce any influence of noise. The signal processing unit 44 compares the detected difference signal generated by a finger to a predetermined threshold voltage. If the detected difference signal is smaller than the threshold voltage, the signal processing unit 44 determines that an external proximity conducting body is in the non-contact state. On the other hand, the signal processing unit 44 compares the detected digital voltage to the predetermined threshold voltage, and determines that an external proximity conducting body is in the contact state if the voltage is equal to or larger than the threshold voltage. In this manner, the touch detection unit 40 achieves touch detection.

The coordinate extracting unit 45 is a logic circuit that calculates, when the signal processing unit 44 has detected a touch, the touch panel coordinates of the touch. The detection timing control unit 46 controls the A/D conversion unit 43, the signal processing unit 44, and the coordinate extracting unit 45 to operate in synchronization with one another. The coordinate extracting unit 45 outputs the touch panel coordinates as a detection signal output Vout.

Figure 8:
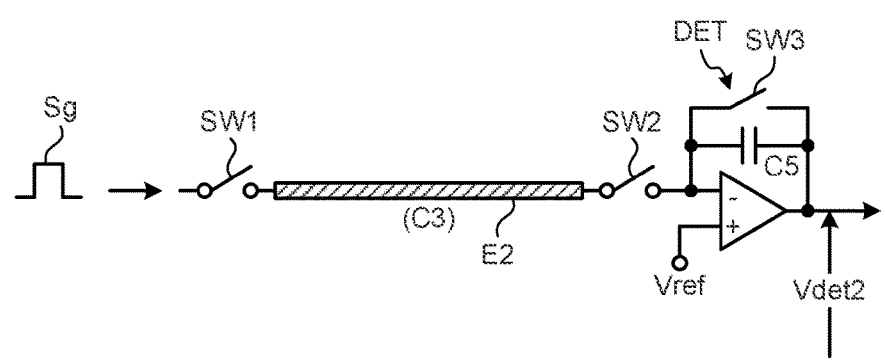
FIG. 8 is a diagram for explaining the basic principle of self-capacitive touch detection, illustrating a state in which a finger is not in contact with or close to a device.
Figure 9:
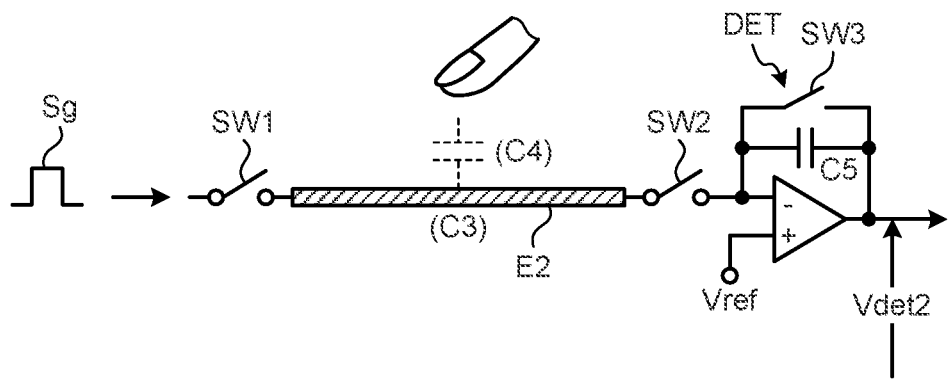
FIG. 9 is a diagram for explaining the basic principle of self-capacitive touch detection, illustrating a state in which a finger is in contact with or close to a device.
Figure 10:
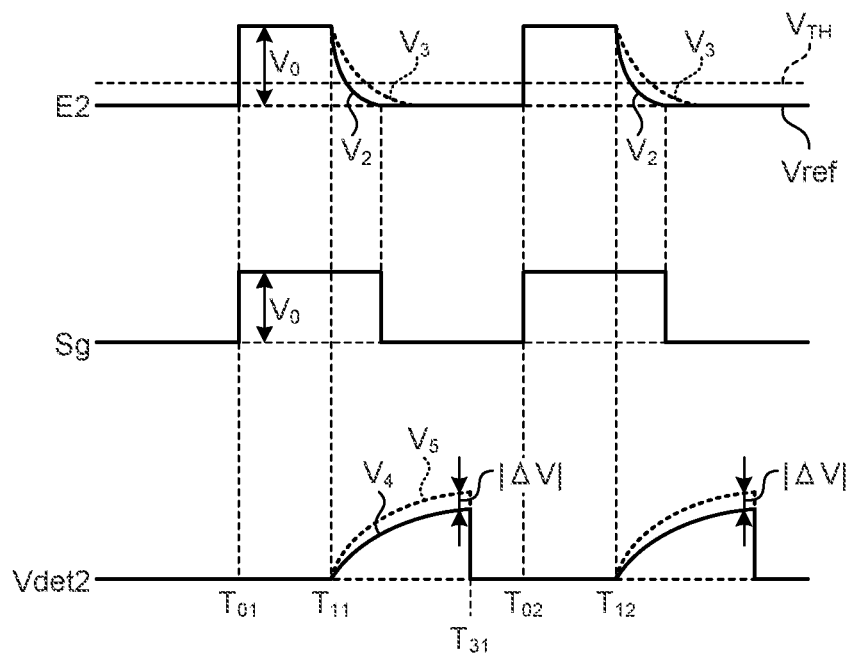
FIG. 10 is a diagram illustrating exemplary waveforms of a drive signal and a touch detection signal in self-capacitive touch detection.

The following describes the basic principle of self-capacitive touch detection by the display device 1 with a touch detection function according to the present embodiment in the second touch detection mode with reference to FIGS. 8 to 10. FIG. 8 is a diagram for explaining the basic principle of self-capacitive touch detection, illustrating that a finger is not in contact with or close to a device. FIG. 9 is a diagram for explaining the basic principle of self-capacitive touch detection, illustrating that a finger is in contact with or close to a device. FIG. 10 is a diagram illustrating exemplary waveforms of a drive signal and a touch detection signal. FIGS. 8 and 9 each illustrate a detection circuit.

As illustrated in FIG. 8, when a finger is not in contact with or in proximity to the device, the AC rectangular wave Sg at a predetermined frequency (e.g., approximately several kilohertz to several hundred kilohertz) is applied to the touch detection electrode E2. Because the touch detection electrode E2 has a capacitance C3, electric current depending on the capacitance C3 flows. The voltage detector DET converts fluctuations in the electric current depending on the AC rectangular wave Sg into fluctuations in the voltage (waveform $V_4$ indicated by the solid line illustrated in FIG. 10).

Then, as illustrated in FIG. 9, when a finger is in contact with or close to a device, a capacitance C4 between the finger and touch detection is applied to the capacitance C3 of the touch detection electrode E2. Thus, electric current flows in accordance with the capacitance C3 and the capacitance C4 when the alternate current rectangular wave Sg is applied to the touch detection electrode E2. As illustrated in FIG. 10, the voltage detector DET converts variation of current in accordance with the alternate current rectangular wave Sg into variation of voltage (a waveform $V_5$ illustrated by a dotted line). Then, by integrating the obtained voltage values of the waveform $V_4$ and the waveform $V_5$ and comparing these values, it is possible to determine whether any finger is in contact with or close to the touch detection electrode E2. In FIG. 10, another method may be employed to obtain periods until a waveform $V_2$ and a waveform $V_3$ are lowered to a predetermined reference voltage and compare these periods.

Specifically, as illustrated in FIGS. 8 and 9, the touch detection electrode E2 can be disconnected from the power source by a switch SW1 and from the voltage detector DET by a switch SW2. As illustrated in FIG. 10, the AC rectangular wave Sg raises the voltage level by an amount corresponding to voltage V0 at time T01. At this time, the switch SW1 is turned on, and the switch SW2 is turned off. As a result, the voltage level in the touch detection electrode E2 is also raised by the voltage V0. Subsequently, the switch SW1 is turned off before time T11. While the touch detection electrode E2 is in a floating state, the electric potential of the touch detection electrode E2 is maintained at VO by the capacitance C3 (refer to FIG. 8) of the touch detection electrode or a capacitance (C3+C4, refer to FIG. 9) obtained by adding a capacitance C4 generated by the finger or the like in contact with or in proximity to the device to the capacitance C3 of the touch detection electrode. Subsequently, a switch SW3 is turned on before the time T11 and is turned off after predetermined time has elapsed, thereby resetting the voltage detector DET. With this reset operation, the output voltage is made substantially equal to Vref.

Subsequently, when the switch SW2 is turned on at the time T11, the voltage in an inverting input unit of the voltage detector DET is increased by the voltage $V_0$ to the same voltage level of the touch detection electrode E2. Thereafter, the inverting input unit of the voltage detector DET is reduced to a reference voltage Vref in accordance with a time constant of the capacitance C3 (or C3+C4) of the touch detection electrode E2 and capacitance C5 in the voltage detector DET. Because the electric charge accumulated in the capacitance C3 (or C3+C4) in the touch detection electrode E2 is transferred to the capacitance C5 in the voltage detector DET, output from the voltage detector DET is increased (Vdet2). When a finger or the like is not close to the touch detection electrode E2, the output (Vdet2) from the voltage detector DET is represented by the waveform $V_4$ illustrated by the solid line, and Vdet2 $=C3 \times V_0/C5$ is satisfied. When a capacitance generated by a finger or the like is added, the output is represented by the waveform $V_5$ illustrated by the dotted line, and Vdet2=(C3+C4)$\times V_0$/C5 is satisfied. Thereafter, at time T31 after the electric charge in the capacitance C3 (or C3+C4) of the touch detection electrode E2 has been sufficiently transferred to the capacitance C5, the switch SW2 is turned off, and the switch SW1 and the switch SW3 are turned on. As a result, the electric potential of the touch detection electrode E2 is reduced to a low level equal to that of the alternate current rectangular wave Sg, and the voltage detector DET is reset. The timing of turning on the switch SW1 may be any timing as long as it is after the turning off of the switch SW2 and before time T02. The timing of resetting the voltage detector DET may be any timing after the switch SW2 is turned off and before time T12. The operation described above is repeated at a predetermined frequency (for example, approximately several kHz to several hundred kHz). The presence of any external proximity object (a touch) can be determined based on the absolute value $|\Delta V|$ of the difference between the waveform $V_4$ and the waveform $V_5$. As illustrated in FIG. 10, when a finger or the like is not close to the touch detection electrode E2, the electric potential of the touch detection electrode E2 has the waveform $V_2$. When the capacitance C4 generated by a finger or the like is added, the electric potential has the waveform $V_3$. The presence of any external proximity object (a touch) can be determined by measuring time until the waveform $V_2$ and the waveform $V_3$ are reduced to a predetermined voltage VTH.

In the touch panel 30 illustrated in FIG. 2, electric charge is supplied to a plurality of touch detection electrodes TDL to be described below in accordance with a second drive signal Vx supplied from the TDL driver 48, and self-capacitive touch detection on the button part 30b is performed.

The touch panel 30 outputs the second touch detection signals Vdet2 from the touch detection electrodes TDL to be described below through the voltage detector DET illustrated in FIG. 8 or 9. The second touch detection signals Vdet2 are supplied to the X detection unit 47 of the touch detection unit 40.

The A/D conversion unit 49 performs an A/D conversion on a signal input from the X detection unit 47 and outputs the converted signal to the signal processing unit 44. The signal processing unit 44 is a logic circuit that detects any touch on the touch panel 30 based on the output signal from the A/D conversion unit 49. The signal processing unit 44 performs the processing to extract only a difference voltage generated by a finger. The signal processing unit 44 compares the detected difference voltage generated by a finger to a predetermined threshold voltage. If the difference voltage is equal to or larger than the threshold voltage, the signal processing unit 44 determines that an external proximity conducting body, which is approaching from the outside, is in the contact state. If the difference voltage is less than the threshold voltage, the signal processing unit 44 determines that an external proximity conducting body is in the non-contact state. In this manner, the touch detection unit 40 achieves self-capacitive touch detection in the second touch detection mode.

The signal processing unit 44 may detect any touch on the button part 30b by comparing the output signal from the A/D conversion unit 49 and the output signal from the A/D conversion unit 43. In this case, the signal processing unit 44 determines any touch detection on the button part 30b by comparing a capacitance difference obtained from the first touch detection signal Vdet1 and a capacitance difference among the touch detection electrodes TDL obtained from the second touch detection signal Vdet2. The signal processing unit 44 may determine any touch on the button part 30b by obtaining the capacitance difference among the touch detection electrodes TDL from the second touch detection signal Vdet2, and comparing capacitances among the touch detection electrodes TDL.

The coordinate extracting unit 45 is a logic circuit that calculates coordinates corresponding to the buttons 102a to 102c (refer to FIG. 1) when the signal processing unit 44 has detected a touch on the button part 30b. In the present embodiment, the coordinate extracting unit 45 outputs an X coordinate. The TDL driver 48 does not operate during mutual capacitive touch detection operation, and thus does not supply electric charge.

Figure 11:
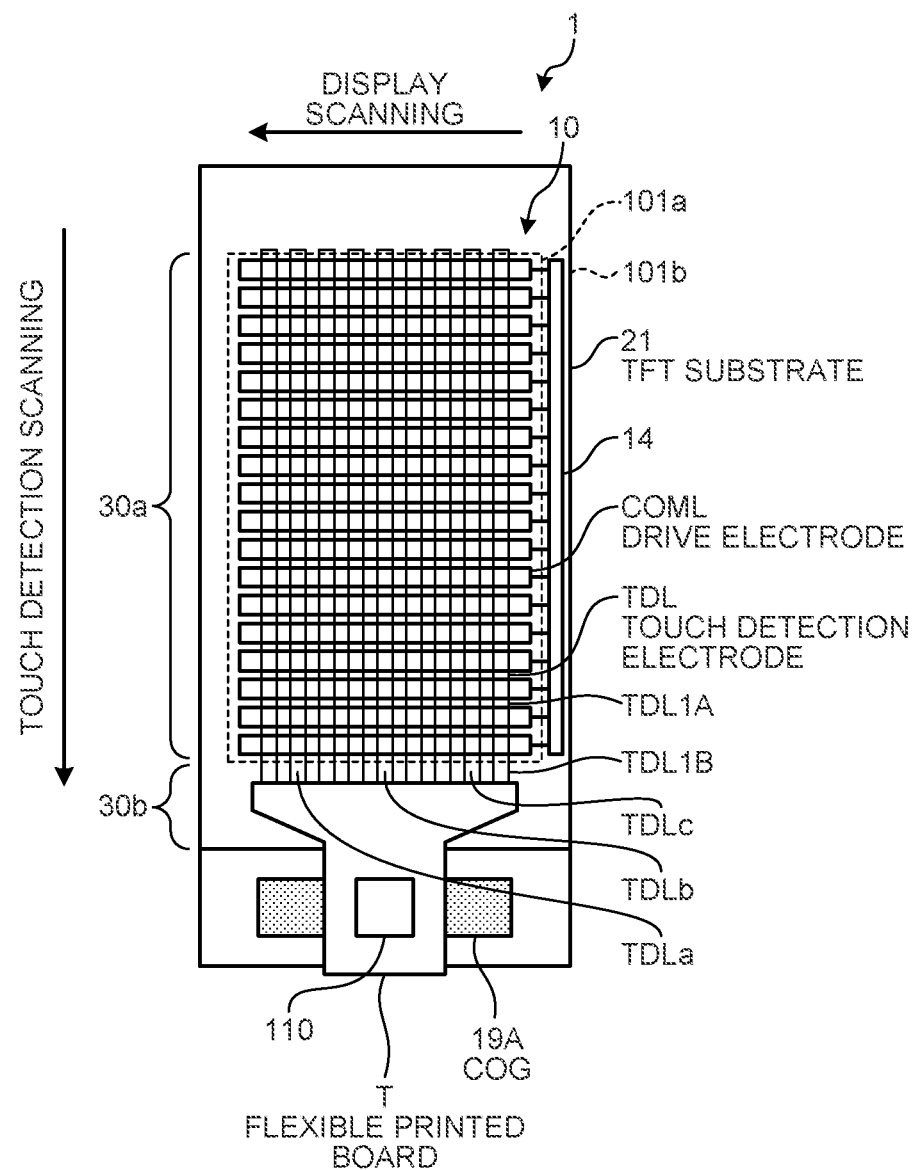
FIG. 11 is a plan view of an exemplary module on which the display device with a touch detection function is mounted.

FIG. 11 illustrates an exemplary module on which the display device with a touch detection function is mounted. As illustrated in FIG. 11, the display device 1 with a touch detection function includes a TFT substrate 21 and a flexible printed board T. The TFT substrate 21 has a chip on glass (COG) 19A mounted thereon, in which the display region 101a of the display panel 20 (refer to FIG. 2) and the frame region 101b surrounding the display region 101a are formed. The COG 19A is an IC driver chip mounted on the TFT substrate 21, including built-in circuits necessary for display operation, such as the control unit 11, the gate driver 12, and the source driver 13 illustrated in FIG. 2. In the present embodiment, the drive electrode driver 14 may be formed on the TFT substrate 21 as a glass substrate. The COG 19A and the drive electrode driver 14 are provided in the frame region 101b. The COG 19A may incorporate the drive electrode driver 14. In this case, the frame region 101b can have a narrower shape.

The flexible printed board T is provided on a short side of the display region 101a, and a touch IC 110 is mounted on the flexible printed board T. The touch IC 110 includes the touch detection unit 40 (refer to FIG. 2). The touch IC 110 is coupled to each of the touch detection electrodes TDL provided adjacent to the touch IC 110, and touch detection signals (the first touch detection signal Vdet1 and the second touch detection signal Vdet2 described above) of the touch detection electrodes TDL are supplied to the touch IC 110. The flexible printed board T is not limited to the flexible printed board, and may be a terminal. In this case, the touch IC 110 is provided out of the module.

As illustrated in FIG. 11, the display unit 10 with a touch detection function is provided with, in the direction perpendicular to the surface of the TFT substrate 21, the drive electrodes COML, and the touch detection electrodes TDL formed to three-dimensionally intersect with the drive electrodes COML. Each drive electrode COML extends in a direction along the short side of the display region 101a, and each touch detection electrode TDL extends in a direction along a long side of the display region 101a. The drive electrodes COML and the touch detection electrodes TDL are provided at a position to be superimposed on the display region 101a.

In the present embodiment, the display device 1 with a touch detection function includes the touch part 30a and the button part 30b. The touch part 30a is provided at a position to be superimposed on the display region 101a of the display panel 20 (refer to FIG. 2), and the button part 30b is provided at a position to be superimposed on the buttons 102a to 102c (refer to FIG. 1) of the frame region 101b. The button part 30b is a part of the frame region 101b adjacent to the short side of the display region 101a, and is a region extending in a direction parallel to the short side of the display region 101a. As illustrated in FIG. 11, the touch detection electrode TDL includes a first part TDL1A extending in the touch part 30a, and a second part TDL1B continuous with the first part TDL1A and extending to the button part 30b. The second part TDL1B is coupled to the flexible printed board T.

Touch detection electrodes TDLa, TDLb, and TDLc illustrated in FIG. 11 correspond to the buttons 102a, 102b, and 102c (refer to FIG. 1), respectively. Specifically, the touch detection electrode TDLa corresponds to the button 102a and detects a touch input on the "back button", the touch detection electrode TDLb corresponds to the button 102b and detects a touch input on the "home button", and the touch detection electrode TDLc corresponds to the button 102c and detects a touch input on the "menu button".

In the present embodiment, as described above, touch detection on the touch part 30a is performed by mutual capacitive touch detection. The display device 1 with a touch detection function sequentially scans each detection line by sequentially supplying the first drive signal Vcom to the drive electrodes COML, and then the first touch detection signal Vdet1 is output from the touch detection electrodes TDL. Touch detection on the button part 30b is performed by self-capacitive touch detection. The display device 1 with a touch detection function measures a self-capacitive change in the touch detection electrodes TDL by supplying the second drive signal Vx to the touch detection electrodes TDL. Since the drive electrodes COML for touch detection on the button part 30b are not provided to the button part 30b, the TFT substrate 21 can be simplified.

The display device 1 with a touch detection function illustrated in FIG. 11 outputs the first touch detection signal Vdet1 and the second touch detection signal Vdet2 described above from the short side of the display region 101a. This facilitates routing of wires when the display device 1 with a touch detection function is coupled to the touch IC 110 through the flexible printed board T as a terminal unit.

Figure 12:
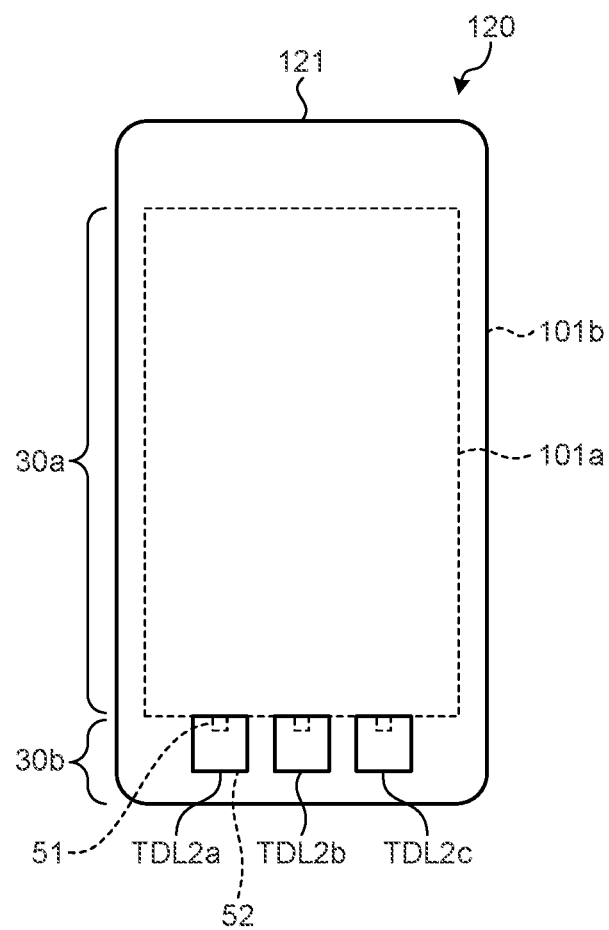
FIG. 12 is a plan view of a cover member.

FIG. 12 is a plan view of a cover member. As illustrated in FIG. 12, a cover member 120 includes a cover glass 121 and a plurality of 0D touch detection electrodes TDL2a to TDL2c provided to the button part 30b of the cover glass 121. The 0D touch detection electrodes TDL2a to TDL2c are overlapping electrodes that are superimposed on a part of the touch detection electrodes TDLa to TDLc illustrated in FIG. 11. The 0D touch detection electrodes TDL2a to TDL2c are arranged at positions corresponding to the buttons 102a to 102c (refer to FIG. 1), respectively. The 0D touch detection electrodes TDL2a to TDL2c are provided in the button part 30b at positions contacting the touch part 30a, and each include an overlapping part 51 that overlaps the touch detection electrodes TDL, and a part 52 that does not overlap the touch detection electrodes TDL. The 0D touch detection electrodes TDL2a to TDL2c are rectangular in a plan view, but are not limited to this shape, and may have different shapes such as a circular shape and a polygonal shape.

The overlapping part 51 is provided at a position to be superimposed on the second part TDL1B (refer to FIG. 11) of the touch detection electrode TDL. This configuration achieves capacitive coupling of the overlapping part 51 and the second part TDL1B of the touch detection electrode TDL. Thus, when a user performs input operations on the 0D touch detection electrodes TDL2a to TDL2c each having a wide area, capacitance generated between the 0D touch detection electrodes TDL2a to TDL2c and a finger or the like is added to the capacitance of the touch detection electrode TDL through the overlapping part 51. In this manner, a detection range of a button touch input can be extended, thereby improving detection sensitivity.

As illustrated in FIGS. 11 and 12, the 0D touch detection electrodes TDL2a to TDL2c are arranged at a pitch larger than a pitch at which the touch detection electrodes TDL are arranged in a direction intersecting a direction in which the touch detection electrodes TDL extend. Thus, the second part TDL1B of each touch detection electrode TDL includes a part that overlaps the 0D touch detection electrodes TDL2a to TDL2c, and a part that does not overlap the 0D touch detection electrodes TDL2a to TDL2c. For example, when the 0D touch detection electrode TDL2a illustrated in FIG. 12 and the second part TDL1B of the touch detection electrode TDLa illustrated in FIG. 11 are capacitively couple to each other, it is possible to suppress capacitive coupling between the second part TDL1B that does not overlap the 0D touch detection electrode TDL2a and the 0D touch detection electrode TDL2a. Accordingly, detection accuracy can be improved at the touch detection electrodes TDL corresponding to any one of the buttons 102a to 102c on which a button touch input is performed.

Figure 13:
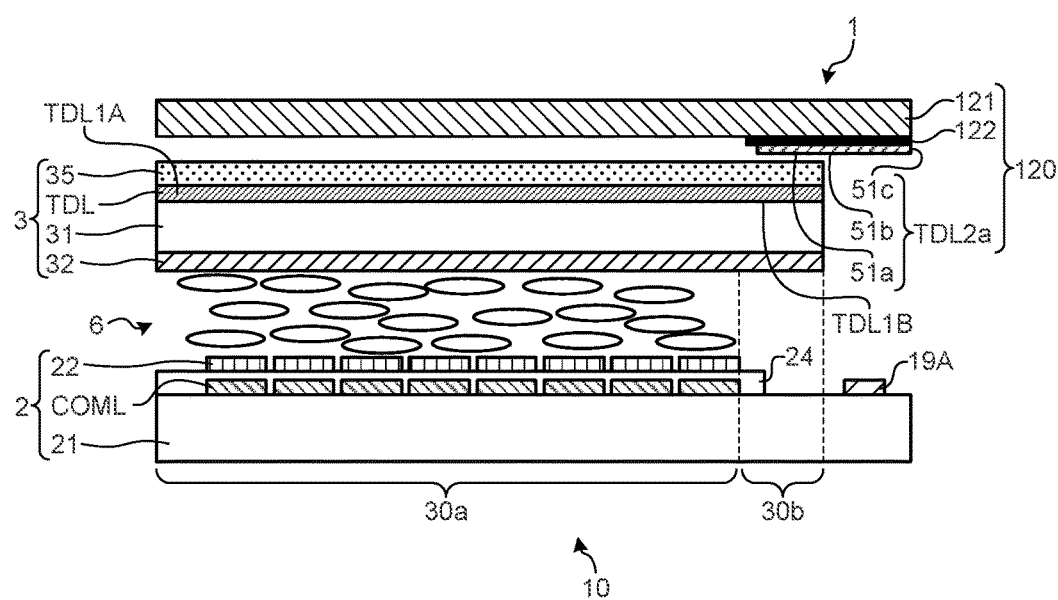
FIG. 13 is a sectional view of a schematic sectional structure of the display device with a touch detection function according to the first embodiment.
Figure 14:
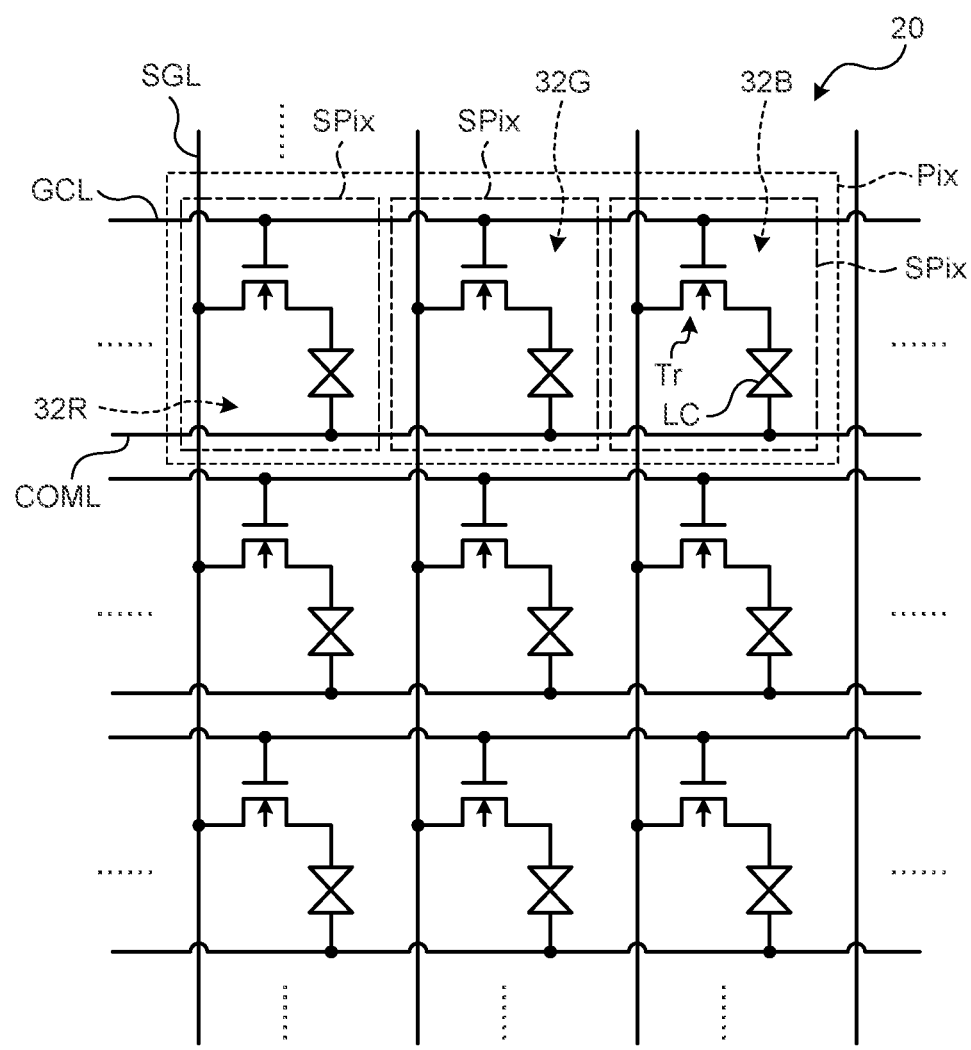
FIG. 14 is a circuit diagram illustrating a pixel array of a display unit with a touch detection function according to the first embodiment.

The following describes an exemplary configuration of the display unit 10 with a touch detection function in greater detail. FIG. 13 is a sectional view of a schematic sectional structure of the display device with a touch detection function according to the first embodiment. FIG. 14 is a circuit diagram illustrating a pixel array of the display unit with a touch detection function according to the first embodiment.

As illustrated in FIG. 13, the display unit 10 with a touch detection function includes a pixel substrate 2, a counter substrate 3, and a liquid crystal layer 6. The counter substrate 3 is arranged facing the surface of the pixel substrate 2 in a perpendicular direction. The liquid crystal layer 6 is interposed between the pixel substrate 2 and the counter substrate 3. From the perspective of protecting the display unit 10 with a touch detection function, for example, the cover member 120 is arranged in a direction perpendicular to the surface of the display unit 10 with a touch detection function.

The pixel substrate 2 includes the thin film transistor (TFT) substrate 21 as a circuit substrate, a plurality of pixel electrodes 22 arranged in a matrix on the TFT substrate 21, the drive electrodes COML formed between the TFT substrate 21 and the pixel electrodes 22, and an insulating layer 24 that insulates the pixel electrodes 22 from the drive electrodes COML.

The counter substrate 3 includes a glass substrate 31, and a color filter 32 formed on one surface of the glass substrate 31. The touch detection electrodes TDL serving as detection electrodes of the touch panel 30 are formed on the other surface of the glass substrate 31, and a polarization plate 35 is arranged on the touch detection electrodes TDL. In FIG. 13, the flexible printed board T and the touch IC 110 (refer to FIG. 11) are omitted.

The cover member 120 is arranged on an outermost side of the display device 1 with a touch detection function, and the cover glass 121 opposes the TFT substrate 21 in the direction perpendicular to the surface of the TFT substrate 21. The cover glass 121 is, for example, a glass substrate. A light-shielding layer 122 is provided on the back surface (surface closer to the display unit 10 with a touch detection function) of the cover glass 121. The light-shielding layer 122 is provided in a region overlapping the frame region 101b (refer to FIG. 12). The 0D touch detection electrodes TDL2a to TDL2c are formed on a surface of the light-shielding layer 122 that is closer to the display unit 10 with a touch detection function. Thus, the 0D touch detection electrodes TDL2a to TDL2c are arranged at a position farther from the TFT substrate 21 than the touch detection electrodes TDL in the direction perpendicular to the surface of the TFT substrate 21. FIG. 13 illustrates only the 0D touch detection electrode TDL2a among the 0D touch detection electrodes TDL2a to TDL2c. The 0D touch detection electrode TDL2a faces the second part TDL1B extending in the button part 30b of each touch detection electrode TDL. Since the cover glass 121 is arranged on an outermost side of the display device 1 with a touch detection function, when the user brings a finger or the like into contact with or close to, for example, the button 102a, a capacitance is generated between the finger or the like and the 0D touch detection electrode TDL2a, and the capacitance of the touch detection electrode TDL is changed accordingly through the 0D touch detection electrode TDL2a. The 0D touch detection electrode TDL2a is hidden behind the light-shielding layer 122 when viewed by the user, thereby lowering its visibility from the user. The 0D touch detection electrode TDL2a, which is provided on the back surface of the light-shielding layer 122, may be made of a non-translucent metal material such as copper (Cu) and silver (Ag).

According to the present embodiment, the 0D touch detection electrodes TDL2a to TDL2c for the 0D buttons are formed on the back surface of the cover glass 121, and thus allowed to have large sizes. In this manner, the display device 1 with a touch detection function can have an extended detection range of a button touch input, thereby improving detection sensitivity. In addition, the display device 1 with a touch detection function can have a shortened distance between the touch detection electrodes TDL and a finger or a stylus, thereby improving detection sensitivity and thus improving operability of the smartphone 100.

The liquid crystal layer 6 modulates light passing therethrough depending on the state of an electric field. The liquid crystal layer 6, for example, is a display panel including liquid crystals in a lateral electric-field mode, such as the in-plane switching (IPS) mode including the fringe field switching (FFS) mode. An orientation film may be provided between the liquid crystal layer 6 and the pixel substrate 2 and between the liquid crystal layer 6 and the counter substrate 3 illustrated in FIG. 13.

The TFT substrate 21 illustrated in FIG. 13 includes a thin film transistor element (hereinafter referred to as a TFT element) Tr of each sub pixel SPix illustrated in FIG. 14, and wiring such as a pixel signal line SGL for supplying the pixel signal Vpix to each pixel electrode 22 illustrated in FIG. 13, and a scanning signal line GCL for driving the TFT element Tr. The pixel signal line SGL and the scanning signal line GCL extend in a plane parallel to the surface of the TFT substrate 21.

The display panel 20 illustrated in FIG. 14 includes the sub pixels SPix arrayed in a matrix. The sub pixels SPix each include the TFT element Tr and a liquid crystal element LC. The TFT element Tr includes a thin film transistor, in this example, an n-channel metal oxide semiconductor (MOS) TFT. One of the source and the drain of the TFT element Tr is coupled to the pixel signal line SGL, the gate thereof is coupled to the scanning signal line GCL, and the other of the source and the drain is coupled to one end of the liquid crystal element LC. The liquid crystal element LC has one end coupled to the other of the source and the drain of the TFT element Tr, and the other end coupled to the drive electrode COML.

Each sub pixel SPix is coupled to other sub pixels SPix belonging to the same row of the display panel 20 through the scanning signal line GCL. The scanning signal line GCL is coupled to the gate driver 12 (refer to FIG. 2) and supplied with the scanning signal Vscan from the gate driver 12. In addition, each sub pixel SPix is coupled to other sub pixels SPix belonging to the same column of the display panel 20 through the pixel signal line SGL. The pixel signal line SGL is coupled to the source driver 13 (refer to FIG. 2) and supplied with the pixel signal Vpix from the source driver 13. Further, the sub pixel SPix is coupled to the other sub pixels SPix belonging to the same row through the drive electrodes COML. The drive electrodes COML are coupled to the drive electrode driver 14 (refer to FIG. 2) and supplied with the first drive signal Vcom from the drive electrode driver 14. In this example, a plurality of the sub pixels SPix belonging to the same row share the single drive electrode COML.

The gate driver 12 illustrated in FIG. 2 performs driving to sequentially scan the scanning signal lines GCL. The scanning signal Vscan (refer to FIG. 2) is applied to the gate of the TFT element Tr of the sub pixel SPix through the scanning signal lines GCL, sequentially selecting one horizontal line of the sub pixels SPix as display drive targets. In the display device 1 with a touch detection function, the source driver 13 supplies the pixel signal Vpix to the sub pixels SPix belonging to the one horizontal line, thereby performing display for each horizontal line. In this display operation, the drive electrode driver 14 applies the first drive signal Vcom to the drive electrode COML corresponding to the horizontal line.

In the color filter 32 illustrated in FIG. 13, color regions colored in, for example, three colors of red (R), green (G), and blue (B) are periodically arrayed, and color regions 32R, 32G, and 32B of three colors of R, G, and B are associated with respective sub pixels SPix thereby constituting a pixel Pix illustrated in FIG. 14 described above. The color filter 32 faces the liquid crystal layer 6 in the direction perpendicular to the TFT substrate 21. The color filter 32 may be colored in any combination of other colors different from each other. The color filter 32 is not limited to a combination of three colors, and may have a combination of four colors or more.

Each drive electrode COML according to the present embodiment serves as a drive electrode of the display panel 20 and also as a drive electrode of the touch panel 30. FIG.

15 is a perspective view illustrating an exemplary configuration of drive electrodes and touch detection electrodes of the display unit with a touch detection function according to the first embodiment. The touch panel 30 includes the drive electrodes COML provided to the pixel substrate 2 and the touch detection electrodes TDL provided to the counter substrate 3.

Figure 15:
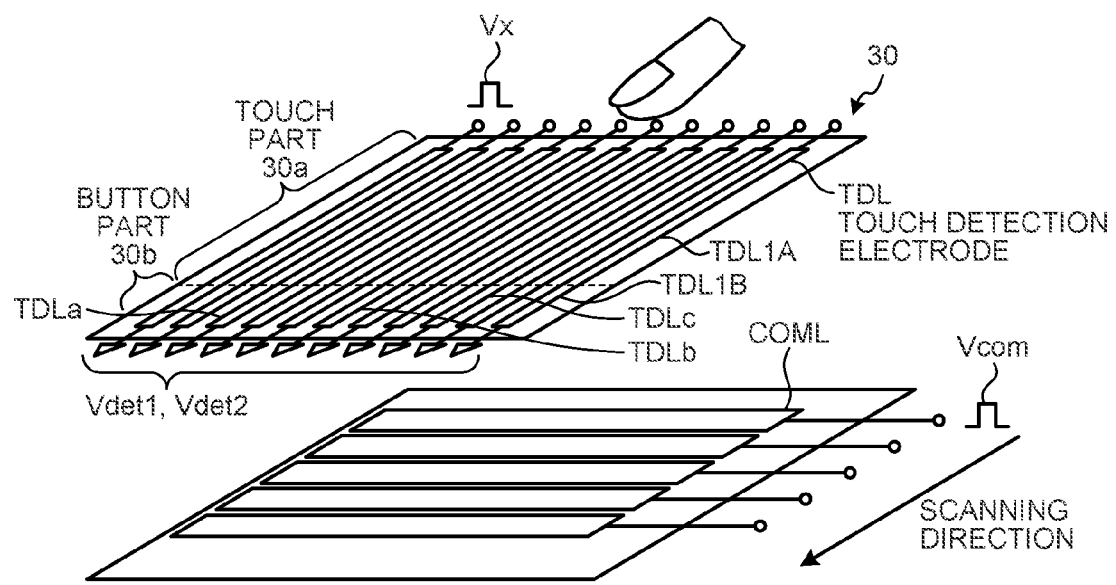
FIG. 15 is a perspective view illustrating an exemplary configuration of drive electrodes and touch detection electrodes of the display unit with a touch detection function according to the first embodiment.

The drive electrodes COML are divided into a plurality of stripe electrode patterns extending in the lateral direction of FIG. 15. The touch detection electrodes TDL are divided into a plurality of stripe electrode patterns extending in a direction intersecting the extending direction of the electrode patterns of the drive electrodes COML. The touch detection electrodes TDL face the drive electrodes COML in the direction perpendicular to the surface of the TFT substrate 21. Each electrode pattern of the touch detection electrodes TDL is coupled to input terminals of the touch detection signal amplifying unit 42 and the X detection unit 47 of the touch detection unit 40, and is coupled to an output terminal of the TDL driver 48 (refer to FIG. 2). In the touch part 30a, a capacitance is generated at each intersecting part where the electrode patterns of the drive electrodes COML and those of the touch detection electrodes TDL intersect with each other.

The touch detection electrodes TDL and the drive electrodes COML are made of, for example, a translucent conductive material such as indium tin oxide (ITO). The shapes of the touch detection electrodes TDL and the drive electrodes COML (drive electrode block) are not limited to the stripe shape, i.e., a shape divided into a plurality of portions. For example, the touch detection electrodes TDL and the drive electrodes COML may have a comb shape. Alternatively, any shape can be employed for the touch detection electrodes TDL and the drive electrodes COML, as long as being divided into a plurality of portions. In this case, the shape of the slits dividing the drive electrodes COML may be a straight line or a curved line.

With this configuration, in the mutual capacitive touch detection operation performed by the touch panel 30, the drive electrode driver 14 performs driving to sequentially scan each detection block of the drive electrodes COML in a time-divisional manner, thereby sequentially selects one detection block of the drive electrodes COML. Then, the touch detection electrodes TDL output the first touch detection signal Vdet1, thereby performing touch detection of the one detection block. Thus, the drive electrode block corresponds to the drive electrode E1 in the basic principle of capacitive touch detection described above, and the touch detection electrode TDL corresponds to the touch detection electrode E2. The touch panel 30 detects a touch on the touch part 30a in accordance with this basic principle. As illustrated in FIG. 15, in the touch part 30a, the mutually intersecting electrode patterns include capacitive touch sensors arranged in a matrix. Thus, it is possible to detect a position at which an external proximity conducting body is in contact with or in proximity to the touch panel 30 by scanning the entire touch detection surface (touch part 30a) of the touch panel 30.

In the self-capacitive touch detection operation performed by the touch panel 30, each touch detection electrode TDL is supplied with the second drive signal Vx and outputs the second touch detection signal Vdet2. As illustrated in FIG. 15, each touch detection electrode TDL includes the first part TDL1A arranged in the touch part 30a and the second part TDL1B arranged in the button part 30b. When the user brings a finger or the like into contact with or close to the buttons 102a to 102c, a capacitance is generated between the finger or the like and the second part TDL1B, and the capacitance of the touch detection electrode TDL is changed accordingly. In this manner, touch detection on the button part 30b is achieved. In the present embodiment, each touch detection electrode TDL can detect whether an external conducting body is in contact with or close to the button part 30b through the capacitance generated between the 0D touch detection electrodes TDL2a to TDL2c (refer to FIGS. 12 and 13) and the touch detection electrode TDL overlapping the 0D touch detection electrodes TDL2a to TDL2c. The touch detection electrode TDL corresponds to the touch detection electrode E2 in the basic principle of the self-capacitive touch detection described above. The touch panel 30 detects a touch input on the button part 30b in accordance with this basic principle. In the self-capacitive touch detection, the TDL driver 48 may simultaneously supply the second drive signals Vx to the touch detection electrodes TDL, or may sequentially select the touch detection electrodes TDL in a time-divisional manner to supply the second drive signals Vx.

Figure 16:
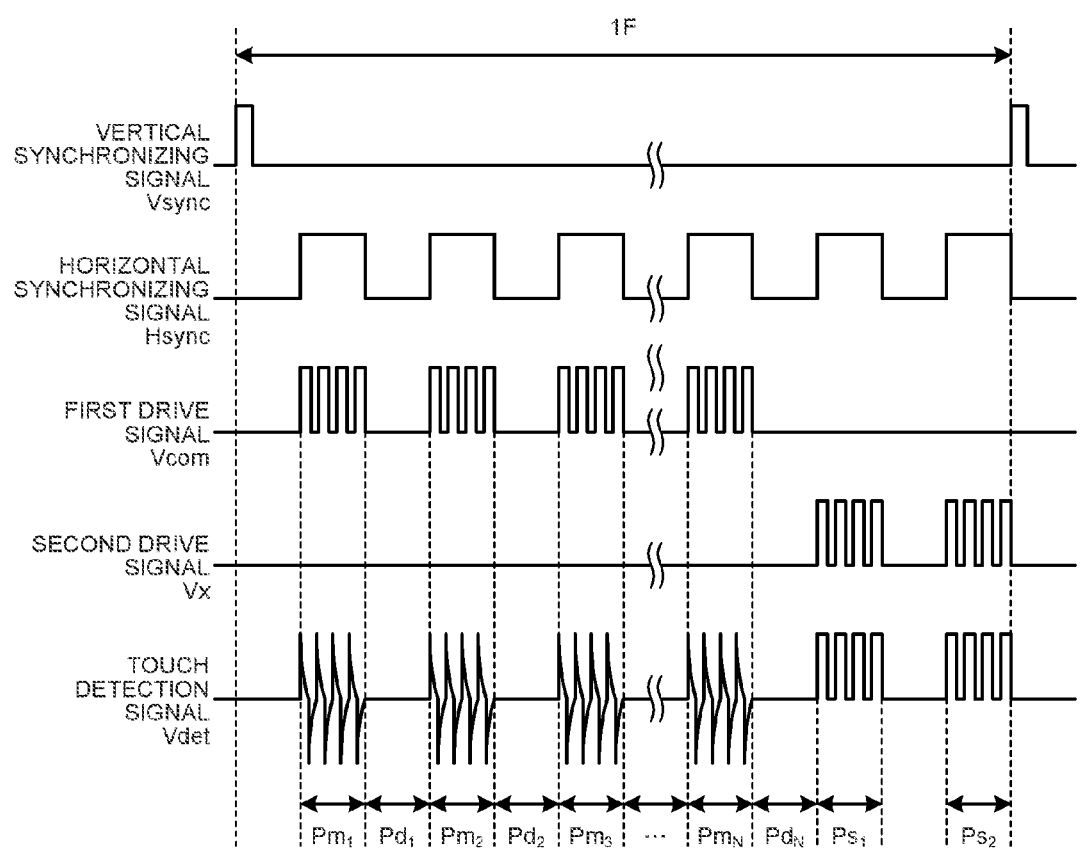
FIG. 16 is a timing waveform diagram illustrating an exemplary operation of the display device with a touch detection function according to the first embodiment in one frame (1F)
Figure 17:
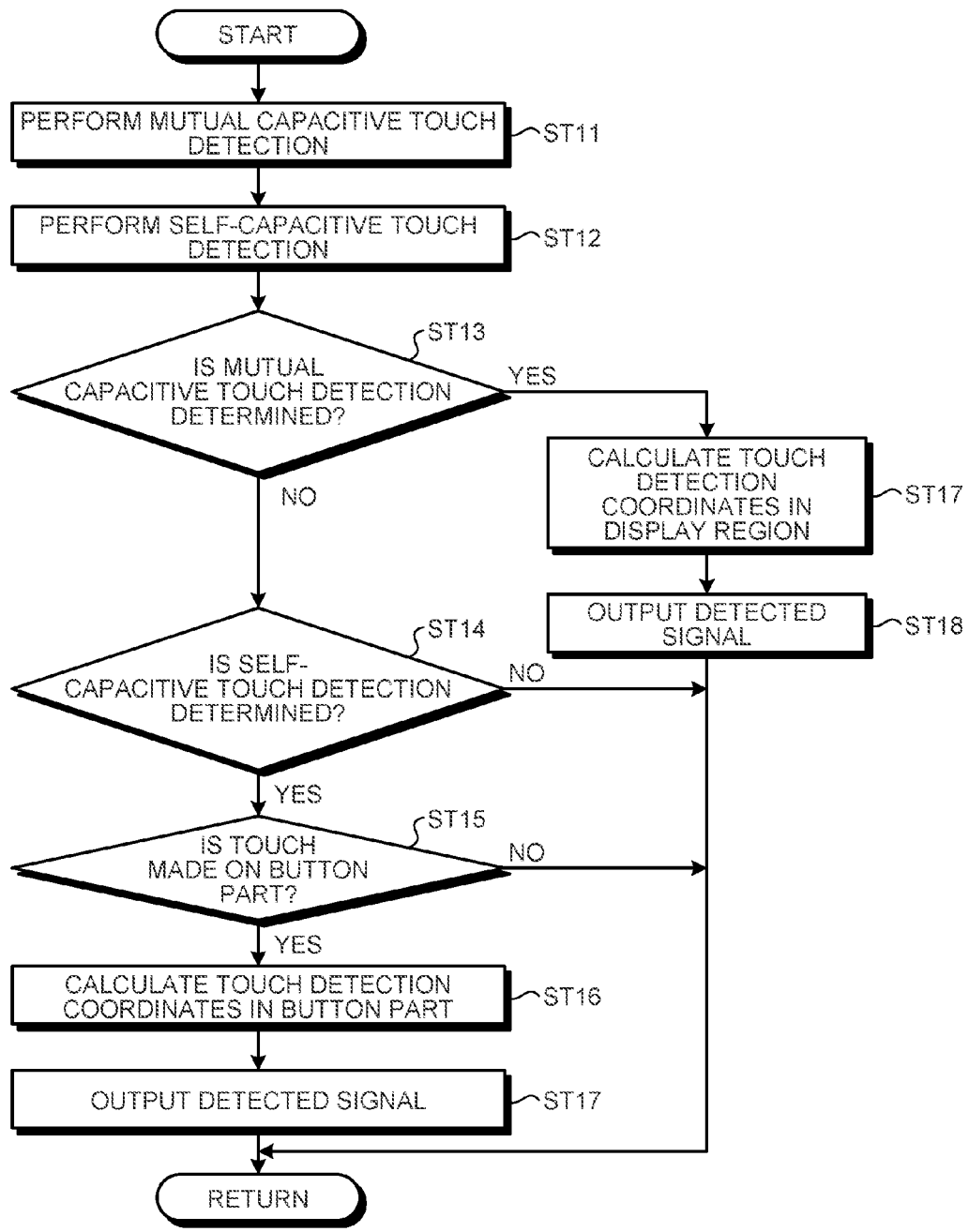
FIG. 17 is a flowchart of a touch detection operation of the display device with a touch detection function according to the first embodiment.

The following describes an operation of the display device 1 with a touch detection function in detail. FIG. 16 is a timing waveform diagram illustrating an exemplary operation of the display device with a touch detection function according to the first embodiment. FIG. 17 is a flowchart of a touch detection operation of the display device with a touch detection function according to the first embodiment.

FIG. 16 schematically illustrates the operation of the display device 1 with a touch detection function in one frame period (1F). In one frame period (1F), a first touch detection period $Pm_n$ (n=1 to N) and a display period $Pd_n$ (n=1 to N) are alternately arranged in a time-divisional manner. In one frame period (1F), second touch detection periods Ps1 and Ps2 are set after the display period $Pd_n$. The display device 1 with a touch detection function performs the mutual capacitive touch detection operation in the first touch detection period $Pm_n$ (n=1 to N), and performs a display operation of image information for one frame in the display period $Pd_n$ (n=1 to N). In the second touch detection periods $Ps_1$ and $Ps_2$, the self-capacitive touch detection operation is performed.

Each drive electrode COML in the touch part 30a serves as a common drive electrode of the display panel 20 and also as the drive electrode of the touch panel 30, which potentially causes influence between the first drive signals Vcom. Thus, the first drive signals Vcom are applied to the drive electrodes COML separately in the display period $Pd_n$ (n=1 to N) in which the display operation is performed, and the first touch detection period $Pm_n$ (n=1 to N) in which the mutual capacitive touch detection operation is performed. The drive electrode driver 14 applies the first drive signal Vcom as a display drive signal in the display period $Pd_n$ (n=1 to N) in which a display operation is performed. The drive electrode driver 14 applies the first drive signal Vcom as a touch drive signal in the first touch detection period $Pm_n$ (n=1 to N). In the following description, the first drive signal Vcom serving as the display drive signal is referred to as a display drive signal Vcomd, and the first drive signal Vcom as the touch drive signal is referred to as a touch drive signal Vcomt.

The touch drive signal Vcomt may be an alternate current rectangle waveform signal, and the display drive signal Vcomd may be a direct current voltage signal or an alternate current rectangle waveform signal.

The following describes the operation of the display device 1 with a touch detection function in one frame period (1F) with reference to FIGS. 2, 16, and 17. First, an operation of the touch part 30a of the display device 1 with a touch detection function will be described. The control unit 11 supplies a control signal to each of the gate driver 12, the source driver 13, the drive electrode driver 14, and the touch detection unit 40 based on the video signal Vdisp supplied from the outside, a vertical synchronizing signal Vsync, and a horizontal synchronizing signal Hsync, and controls the gate driver 12, the source driver 13, the drive electrode driver 14, and the touch detection unit 40 to operate in synchronization with one another. The gate driver 12 supplies the scanning signal Vscan to the display panel 20 in the display period $Pd_n$ (n=1 to N) so as to sequentially select one horizontal line as a display drive target. The source driver 13 supplies the image signal Vpix to each pixel Pix included in the one horizontal line selected by the gate driver 12 in the display period $Pd_n$ (n=1 to N).

In the display period $Pd_n$ (n=1 to N), the drive electrode driver 14 applies the display drive signal Vcomd (Vcom) to a drive electrode block related to one horizontal line. In the first touch detection period $Pm_n$ (n=1 to N), the drive electrode driver 14 sequentially applies the touch drive signal Vcomt (Vcom) to a drive electrode block subjected to the touch detection operation so as to sequentially select one detection block. The display unit 10 with a touch detection function performs the display operation based on signals supplied by the gate driver 12, the source driver 13, and the drive electrode driver 14 in the display period $Pd_n$ (n=1 to N). The display unit 10 with a touch detection function performs the mutual capacitive touch detection operation based on signals supplied by the drive electrode driver 14 in the first touch detection period $Pm_n$ (n=1 to N) (ST11 in FIG. 17), and outputs the first touch detection signals Vdet1 from the touch detection electrodes TDL. The display period $Pd_n$ (n=1 to N) and the first touch detection period $Pm_n$ (n=1 to N) are alternately repeated in a time-divisional manner for all horizontal lines to perform the display operation for one frame period (1F) by scanning the entire display surface, and perform the touch detection operation by scanning the entire touch detection surface (touch part 30a).

Next, an operation of the button part 30b of the display device 1 with a touch detection function will be described. Since the button part 30b of the display device 1 with a touch detection function does not perform the display operation, the operation may be performed only in the second touch detection periods $Ps_1$ and $Ps_2$, but not in the display period $Pd_n$ (n=1 to N). Specifically, the display unit 10 with a touch detection function performs the self-capacitive touch detection operation based on signals supplied by the TDL driver 48 of the touch detection unit 40 in the second touch detection periods $Ps_1$ and $Ps_2$ (step ST12 in FIG. 17), and outputs the second touch detection signals Vdet2 from the touch detection electrodes TDL.

The first touch detection signals Vdet1 output from the touch detection electrodes TDL in the first touch detection period $Pm_n$ (n=1 to N) are supplied to the touch detection signal amplifying unit 42. The touch detection signal amplifying unit 42 amplifies the first touch detection signal Vdet1 and outputs the amplified signal. The A/D conversion unit 43 converts an analog signal output from the touch detection signal amplifying unit 42 into a digital signal at timing in synchronization with the touch drive signal Vcomt (Vcom). The signal processing unit 44 detects any touch on the touch panel 30 based on the output signal from the A/D conversion unit 43 (step ST13 in FIG. 17).

If the signal processing unit 44 determines that there is mutual capacitive touch detection (Yes at step ST13 in FIG. 17), the coordinate extracting unit 45 calculates the touch panel coordinates of the detection (step ST17 in FIG. 17). The coordinate extracting unit 45 outputs the touch panel coordinates as the detection signal output Vout (step ST18 in FIG. 17). Then, the display operation and the touch detection operation are performed for the next one frame period (1F). If the signal processing unit 44 determines that there is no touch detection (No at step ST13 in FIG. 17), the signal processing unit 44 determines whether an input is made on the button part 30b.

The second touch detection signals Vdet2 output from the touch detection electrodes TDL in the second touch detection periods $Ps_1$ and $Ps_2$ are supplied to the X detection unit 47. The X detection unit 47 may include an amplifying unit that amplifies the second touch detection signal Vdet2 and an analog LPF. The A/D conversion unit 49 performs an A/D conversion on a signal input from the X detection unit 47 and outputs the converted signal to the signal processing unit 44. The signal processing unit 44 detects any touch on the touch panel 30 based on the output signal from the A/D conversion unit 49 (step ST14 in FIG. 17).

The second touch detection signal Vdet2 output from the touch detection electrodes TDL includes a detection signal generated by a touch input on the touch part 30a, and a detection signal generated by a touch input on the button part 30b. Thus, if the signal processing unit 44 determines that a touch detection is made (Yes at step ST14 in FIG. 17), the signal processing unit 44 determines whether a touch operation is made on the touch part 30a or on the button part 30b (step ST15 in FIG. 17). If the signal processing unit 44 determines that no touch detection is made (No at step ST14 in FIG. 17), the display operation and the touch detection operation for the next one frame period (1F) are performed.

Figure 18:
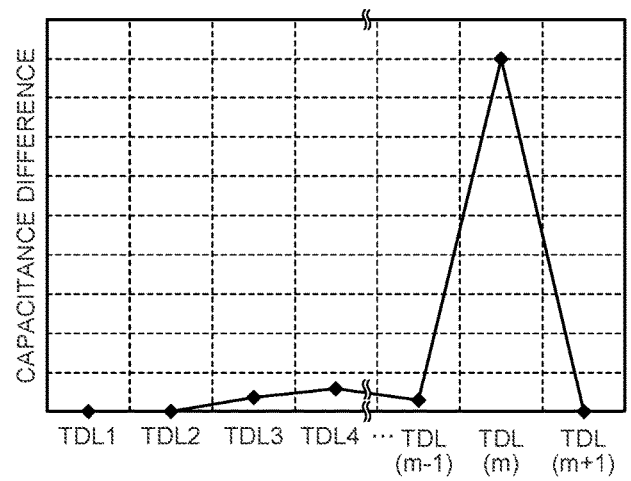
FIG. 18 is a graph schematically illustrating a result of self-capacitive touch detection when a touch input is made on a button part.
Figure 19:
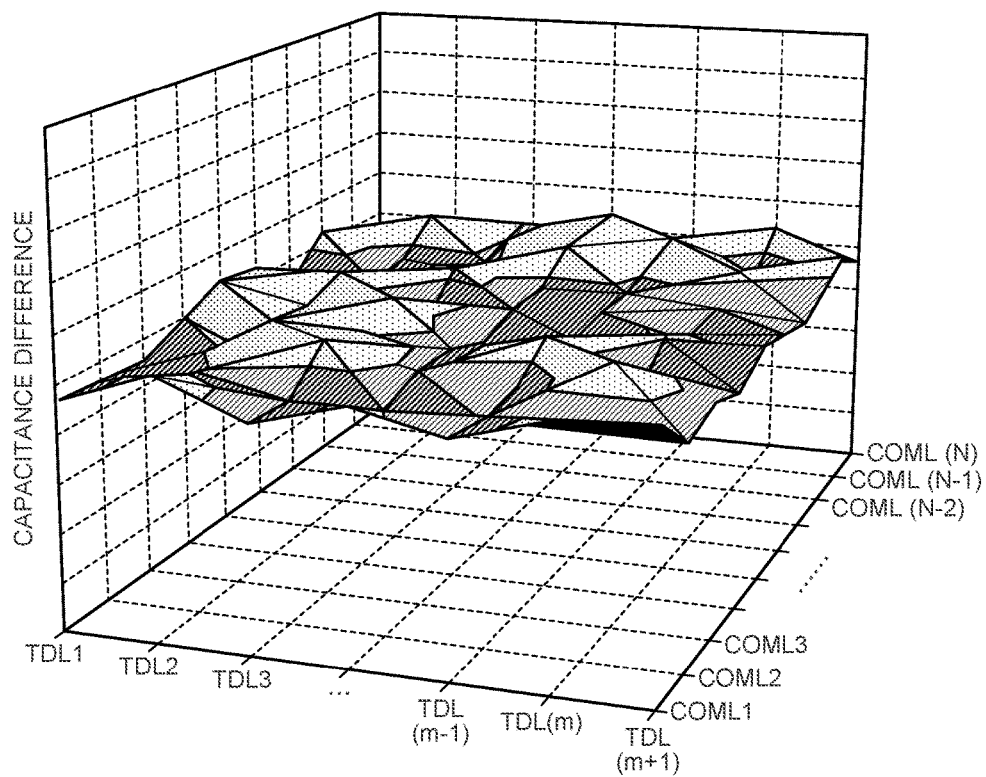
FIG. 19 is a graph schematically illustrating a result of mutual capacitive touch detection when a touch input is made on the button part.
Figure 20:
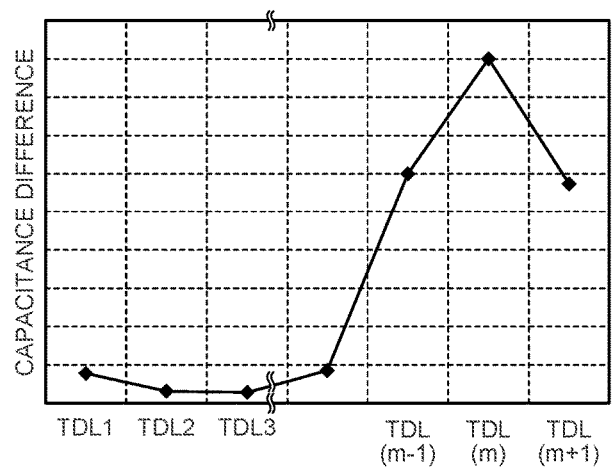
FIG. 20 is a graph schematically illustrating a result of self-capacitive touch detection when a touch input is made on a touch part.
Figure 21:
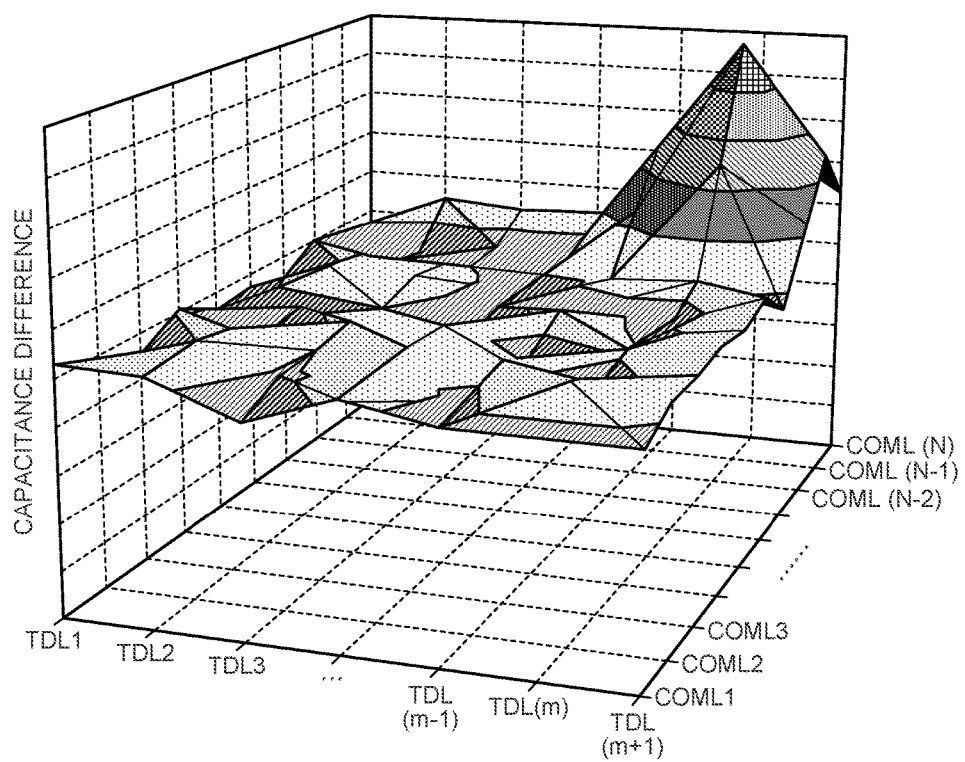
FIG. 21 is a graph schematically illustrating a result of mutual capacitive touch detection when a touch input is made on the touch part.

FIG. 18 is a graph schematically illustrating a result of self-capacitive touch detection when a touch input is made on the button part 30b. In FIG. 18, the abscissa axis represents the position (X coordinate) of each touch detection electrode TDL, and the ordinate axis represents a capacitance difference of each touch detection electrode TDL obtained from the second touch detection signal Vdet2. The capacitance difference is a value obtained by calculating a difference in capacitance components of the touch detection electrode TDL between when a finger is not in contact with or close to the touch detection electrode TDL and when a finger in contact with or close to the touch detection electrode TDL. FIG. 19 is a graph schematically illustrating a result of mutual capacitive touch detection when a touch input is made on the button part 30b. In the graph illustrated in FIG. 19, the x axis represents the position of each touch detection electrode TDL (the X coordinate of the touch part 30a), the y axis represents the position of each drive electrode COML (the Y coordinate of the touch part 30a), and the z axis represents a capacitance difference at an intersection point of the touch detection electrodes TDL and the drive electrodes COML. FIG. 20 is a graph schematically illustrating a result of self-capacitive touch detection when a touch input operation is performed on the touch part 30a. FIG. 21 is a graph schematically illustrating a result of mutual capacitive touch detection when a touch input operation is performed on the touch part 30a.

As illustrated in FIG. 18, when the touch operation is performed on the button part 30b, a large peak of a capacitance difference appears at the touch detection electrode TDL(m) which a finger is in contact with or close to, whereas the capacitance difference is small at the touch detection electrodes TDL(m−1) and TDL(m+1) each adjacent to the touch detection electrode TDL(m). The touch detection electrode TDL(m) is capacitively coupled with any one of the 0D touch detection electrodes TDL2a to TDL2c illustrated in FIG. 12, and its self-capacitance changes in response to a touch input to have a large capacitance difference. On the other hand, since the touch detection electrodes TDL(m−1) and TDL(m+1) each adjacent to the touch detection electrode TDL(m) do not overlap the 0D touch detection electrodes TDL2a to TDL2c, their capacitive coupling with the 0D touch detection electrodes TDL2a to TDL2c is prevented, and a change in their self-capacitance is suppressed. Accordingly, a large peak of a capacitance difference is generated by the one touch detection electrode TDL(m).

The drive electrodes COML are not provided on the button part 30b as illustrated in FIGS. 11 and 15, which prevents a change in the mutual capacitance of the drive electrodes COML and the touch detection electrodes TDL when a touch input is made on the button part 30b. Thus, as illustrated in FIG. 19, no peak of a capacitance difference is detected in the mutual capacitive touch detection.

When a touch input is made on the touch part 30a, a capacitance is generated between a finger in contact with or close to the touch part 30a and the touch detection electrodes TDL. Thus, as illustrated in FIG. 20, the maximum capacitance difference is detected at the touch detection electrode TDL(m) corresponding to a position in the touch part 30a which the finger is in contact with or close to, and a capacitance difference is also detected at the touch detection electrodes TDL(m−1) and TDL(m+1) each adjacent to the touch detection electrode TDL(m).

When a touch input is made on the touch part 30a, the mutual capacitance of the drive electrodes COML and the touch detection electrodes TDL changes at a position which the finger is in contact with or close to. Thus, as illustrated in FIG. 21, a peak of a capacitance difference is detected in the mutual capacitive touch detection. As illustrated in FIGS. 20 and 21, when the touch operation is made on the touch part 30a, the peak of the capacitance difference is detected in the self-capacitive touch detection and the mutual capacitive touch detection.

The signal processing unit 44 compares a capacitance difference (FIG. 19) obtained from the first touch detection signal Vdet1 generated by the mutual capacitive touch detection in the first touch detection period $Pm_n$ (n=1 to N), and a capacitance difference (FIG. 18) obtained from the second touch detection signal Vdet2 generated by the self-capacitive touch detection in the second touch detection periods $Ps_1$ and $Ps_e$. The signal processing unit 44 determines that a touch input is made on the button part 30b if a difference between the capacitance difference obtained from the first touch detection signal Vdet1 and the capacitance difference obtained from the second touch detection signal Vdet2 is equal to or larger than a predetermined value, (Yes at step ST15 in FIG. 17).

As illustrated in FIGS. 20 and 21, if a peak is detected both in a capacitance difference in the self-capacitive touch detection and a capacitance difference in the mutual capacitive touch detection, the signal processing unit 44 compares a capacitance difference between the drive electrode COML at which the capacitance difference peak is detected and each of the touch detection electrodes TDL illustrated in FIG. 21 to a capacitance difference in the self-capacitive touch detection illustrated in FIG. 20. The signal processing unit 44 determines that no touch input is made on the button part 30b if the difference between the capacitance difference obtained from the first touch detection signal Vdet1 (FIG. 21) and the capacitance difference obtained from the second touch detection signal Vdet2 (FIG. 20) is smaller than the predetermined value (No at step ST15 in FIG. 17).

If the signal processing unit 44 determines that a touch input is made on the button part 30b, the coordinate extracting unit 45 calculates the coordinates of the touch on the button part 30b based on the second touch detection signal Vdet2 (step ST16 in FIG. 17) to determine which of the buttons 102a to 102c is touched. Then, the coordinate extracting unit 45 outputs the coordinates of the touch on the button part 30b as the detection signal output Vout (step ST17 in FIG. 17). Thereafter, the display operation and the touch detection operation are performed for the next one frame period (1F). If the signal processing unit 44 determines that no operation is performed on the button part 30b, the detection signal output Vout is not output, and the display operation and the touch detection operation are performed for the next one frame period (1F).

In this manner, touch inputs on the touch part 30a and the button part 30b are detected. In FIG. 16, in one frame period (1F), the second touch detection periods $Ps_1$ and $Ps_2$ are set after the first touch detection period $Pm_n$ (n=1 to N), but may be set before or during the first touch detection period $Pm_n$ (n=1 to N). Although two second touch detection periods, i.e., the second touch detection periods $Ps_1$ and $Ps_2$, are provided in one frame period (1F) in the present embodiment, three or more second touch detection periods may be provided to improve detection accuracy, or one second touch detection period may be provided.

In the present embodiment, any touch input on the button part 30b is determined by comparing the capacitance difference obtained from the first touch detection signal Vdet1 output in the mutual capacitive touch detection, and the capacitance difference obtained from the second touch detection signal Vdet2 output in the self-capacitive touch detection, but other methods may be employed. Any touch operation on the button part 30b may be determined by comparing the capacitance difference of the touch detection electrode TDL(m) and the capacitance difference of the touch detection electrodes TDL(m−1) and TDL(m+1) each adjacent to the touch detection electrode TDL(m) illustrated in FIGS. 18 and 20.

In this case, if the capacitance difference of the touch detection electrodes TDL(m−1) and TDL(m+1) relative to the capacitance difference of the touch detection electrode TDL(m) is smaller than a predetermined threshold, i.e., if a large peak of a capacitance difference is detected at the single touch detection electrode TDL(m), it may be determined that a touch input is made on the button part 30b. If the capacitance difference of the touch detection electrodes TDL(m−1) and TDL(m+1) relative to the capacitance difference of the touch detection electrode TDL(m) is equal to or larger than the predetermined threshold, i.e., a capacitance difference is detected at the touch detection electrodes TDL and a peak width is widened, it may be determined that no touch operation is made on the button part 30b.

Detailed Operation

Figure 22:
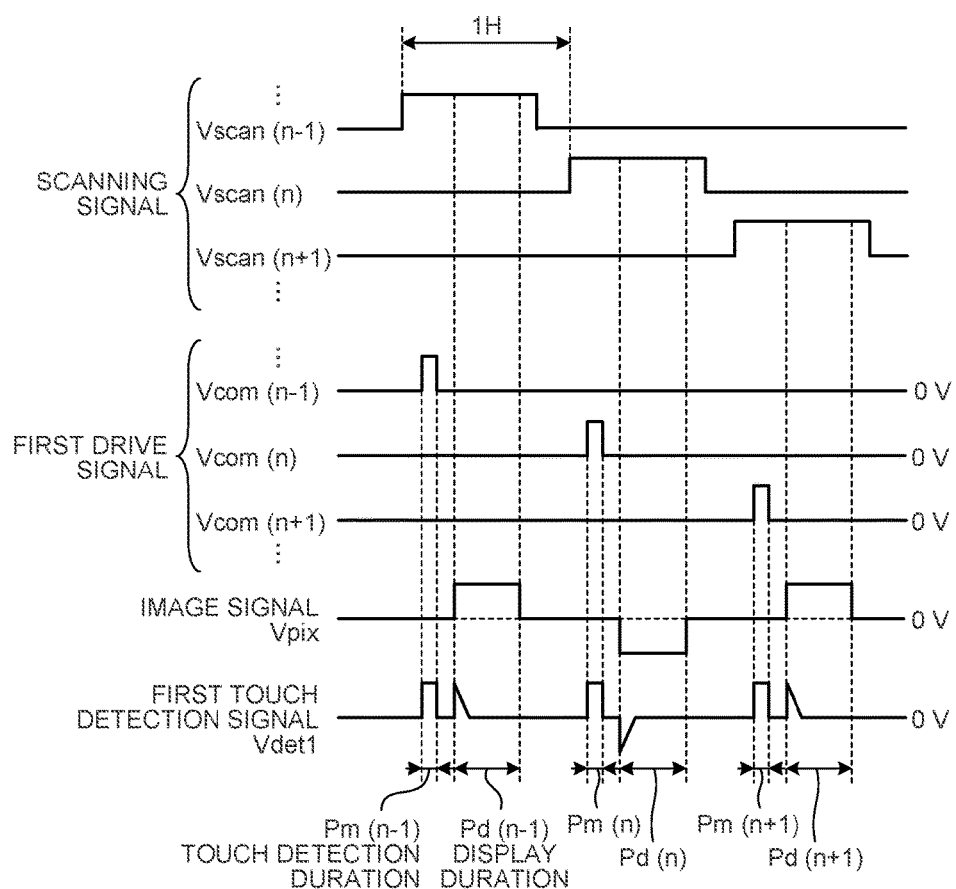
FIG. 22 is a timing waveform diagram illustrating an exemplary operation of the display device with a touch detection function according to the first embodiment.

The following describes a detailed operation of the display device 1 with a touch detection function. First, the operation of the touch part 30a of the display device 1 with a touch detection function will be described. FIG. 22 is a timing waveform diagram illustrating an exemplary operation of the display device with a touch detection function according to the first embodiment. As illustrated in FIG. 22, the display panel 20 performs display by sequentially scanning each horizontal line of the (n−1)-th, the n-th, and the (n+1)-th scanning signal lines GCL adjacent to each other among the scanning signal lines GCL illustrated in FIG. 14 in accordance with the scanning signal Vscan supplied from the gate driver 12. Similarly, the drive electrode driver 14 supplies the first drive signal Vcom to the (n−1)-th, the n-th, and the (n+1)-th drive electrodes COML adjacent to each other among the drive electrodes COML based on the control signal supplied from the control unit 11.

As described above, the display device 1 with a touch detection function performs the touch detection operation in the first touch detection period $Pm_n$ (n=1 to N) and the display operation in the display period $Pd_n$ (n=1 to N) in a time-divisional manner for each display horizontal period (1H). In the touch detection operation, scanning for the touch detection is performed by selecting different drive electrodes COML for each display horizontal period 1H and applying the first drive signal Vcomt (Vcom) for the touch detection to the selected drive electrodes COML. This operation is described in detail below.

First, the gate driver 12 applies the scanning signal Vscan to the (n−1)-th scanning signal line GCL to change the scanning signal Vscan(n−1) from a low level to a high level. This starts one display horizontal period 1H.

Next, in the first touch detection period Pm(n−1), the drive electrode driver 14 applies the touch drive signal Vcomt (Vcom) to the (n−1)-th drive electrode COML to change the first drive signal Vcom(n−1) from a low level to a high level. This first drive signal Vcom(n−1) is transmitted to the touch detection electrodes TDL through a capacitance to change the first touch detection signal Vdet1. Next, when the first drive signal Vcom(n−1) changes from the high level to the low level, the first touch detection signal Vdet1 changes similarly. The waveform of the first touch detection signal Vdet1 in the first touch detection period $Pm_n$ (n=1 to N) corresponds to the first touch detection signal Vdet1 in the basic principle of the mutual capacitive touch detection described above. The A/D conversion unit 43 performs the touch detection by performing an A/D conversion on the first touch detection signal Vdet1 in the first touch detection period $Pm_n$ (n=1 to N). In this manner, the display device 1 with a touch detection function performs the touch detection for one detection line.

Next, in the display period Pd(n−1), the source driver 13 performs display for one horizontal line by applying the image signal Vpix to the pixel signal line SGL. As illustrated in FIG. 22, a change in the image signal Vpix is transmitted to the touch detection electrodes TDL through a parasitic capacitance, so that the first touch detection signal Vdet1 can change. In the display period Pd(n−1), however, the A/D conversion unit 43 can be configured not to perform the A/D conversion, thereby reducing influence of a change in the image signal Vpix on the touch detection. After the source driver 13 completes the supply of the image signal Vpix, the gate driver 12 changes the scanning signal Vscan(n−1) of the (n−1)-th scanning signal line GCL from a high level to a low level, and one display horizontal period (1 H) ends.

In the display period $Pd_n$ (n=1 to N), the drive electrode driver 14 applies the display drive signal Vcomd (Vcom) to the drive electrode COML to be selected. In this example, a direct current voltage of 0 V is applied as Vcomd (Vcom) in the display period $Pd_n$ (n=1 to N).

In other words, in this example, the touch drive signal Vcomt is a rectangular wave signal including a low level part and a high level part, while the display drive signal Vcomd is a direct current voltage signal at a level equal to that of the low level part of the touch drive signal Vcomt.

In this example, the drive electrode driver 14 applies a direct current voltage signal at a level equal to that of the display drive signal Vcomd to a drive electrode COML when the drive electrode COML is not selected by the gate driver 12. However, a voltage signal may not be applied to the drive electrode COML, and the drive electrode COML may be in a floating state without a fixed electric potential.

Next, the gate driver 12 applies the scanning signal Vscan to the n-th scanning signal line GCL different from the previously selected one to change the scanning signal Vscan (n) from the low level to the high level. This starts the next one display horizontal period (1H).

In the next first touch detection period Pm(n), the drive electrode driver 14 applies the first drive signal Vcom to the n-th drive electrode COML different from the previously selected one. Then, the A/D conversion unit 43 performs an A/D conversion on the first touch detection signal Vdet1 to perform the touch detection of this one detection line.

Next, in the display period Pd(n), the source driver 13 applies the image signal Vpix to the pixel signal line SGL to perform display of the one horizontal line. Since the display device 1 with a touch detection function according to the present embodiment performs dot inversion driving, the image signal Vpix applied by the source driver 13 has an inverted polarity as compared to that in the previous one display horizontal period (1H). After the display period Pd(n) ends, this one display horizontal period (1H) ends.

Subsequently, the display device 1 with a touch detection function repeats the operation described above to perform the display operation by scanning the entire display surface and the touch detection operation by scanning the entire touch detection surface.

As described above, in one display horizontal period (1H), the display device 1 with a touch detection function performs the touch detection operation in the first touch detection period $Pm_n$ (n=1 to N) and the display operation in the display period $Pd_n$ (n=1 to N). Since the touch detection operation and the display operation are performed in a time-divisional manner as described above, both of the display operation and the touch detection operation can be performed in the same one display horizontal period, and the influence of the display operation on the touch detection can be reduced.

The display device 1 with a touch detection function does not necessarily need to perform the touch detection operation and the display operation in a time-divisional manner with equal intervals in one display horizontal period (1H). The first touch detection period $Pm_n$ (n=1 to N) and the display period $Pd_n$ (n=1 to N) can be optionally set during one frame period in which display for one screen is performed, to perform the touch detection operation and the display operation in a time-divisional manner. In other words, the display device 1 with a touch detection function may perform screen display and touch detection for one screen by repeating the display operation for a plurality of horizontal lines and the touch detection operation for a plurality of lines. Alternatively, the touch detection may be performed for one screen or less or for one screen or more in the display operation for one screen. Alternatively, the display operation for one screen and the touch detection operation for one screen may be repeated.

Next, the operation of the button part 30b of the display device 1 with a touch detection function will be described. The button part 30b of the display device 1 with a touch detection function does not perform display and performs only the self-capacitive touch detection operation. As illustrated in FIG. 16, only the second touch detection periods $Ps_1$ and $Ps_2$ are provided and the display period $Pd_n$ (n=1 to N) is not provided. Thus, the TDL driver 48 supplies the second drive signal Vx to the touch detection electrodes TDL based on the control signal supplied from the control unit 11. The second touch detection signal Vdet2 output from the touch detection electrodes TDL is changed due to the self-capacitance of the touch detection electrodes TDL. The waveform of the second touch detection signal Vdet2 in the second touch detection periods $Ps_1$ and $Ps_2$ corresponds to the second touch detection signal Vdet2 in the basic principle of self-capacitive touch detection described above. The A/D conversion unit 43 performs the touch detection by performing an A/D conversion on the second touch detection signal Vdet2 in the second touch detection periods $Ps_1$ and $Ps_2$.

As described above, the display device 1 with a touch detection function performs button touch detection on the button part 30b. In the second touch detection periods $Ps_1$ and $Ps_2$, a voltage signal may not be applied to a drive electrode COML so that the drive electrode COML is in a floating state without a fixed electric potential. Alternatively, a voltage signal at a level equal to that of the second drive signal Vx applied to the touch detection electrodes TDL may be applied to the drive electrode COML simultaneously with the second drive signal Vx. As described above, no display operation is performed in the second touch detection periods $Ps_1$ and $Ps_2$. Thus, the scanning signal lines GCL and the pixel signal lines SGL (refer to FIG. 14) may be set to be in a floating state, or may be supplied with a voltage signal at a level equal to that of the second drive signal Vx simultaneously with the second drive signal Vx.

As described above, the display device 1 with a touch detection function according to the present embodiment can realize the buttons 102a to 102c by using the button part 30b of the touch panel 30. Accordingly, in the display device 1 with a touch detection function, there is no need to include a dedicated FPC, a touch sensor, a touch button, and the like to achieve the buttons 102a to 102c. Since a touch input on the button part 30b is detected by the self-capacitive touch detection, the number of electrodes provided to the button part 30b can be reduced to achieve a simplified configuration of the TFT substrate 21. Thus, the display device 1 with a touch detection function can have a simple circuit configuration to prevent an increase in the number of components, thereby preventing an increase in the number of manufacturing processes, and reducing cost.

Second Embodiment

Figure 23:
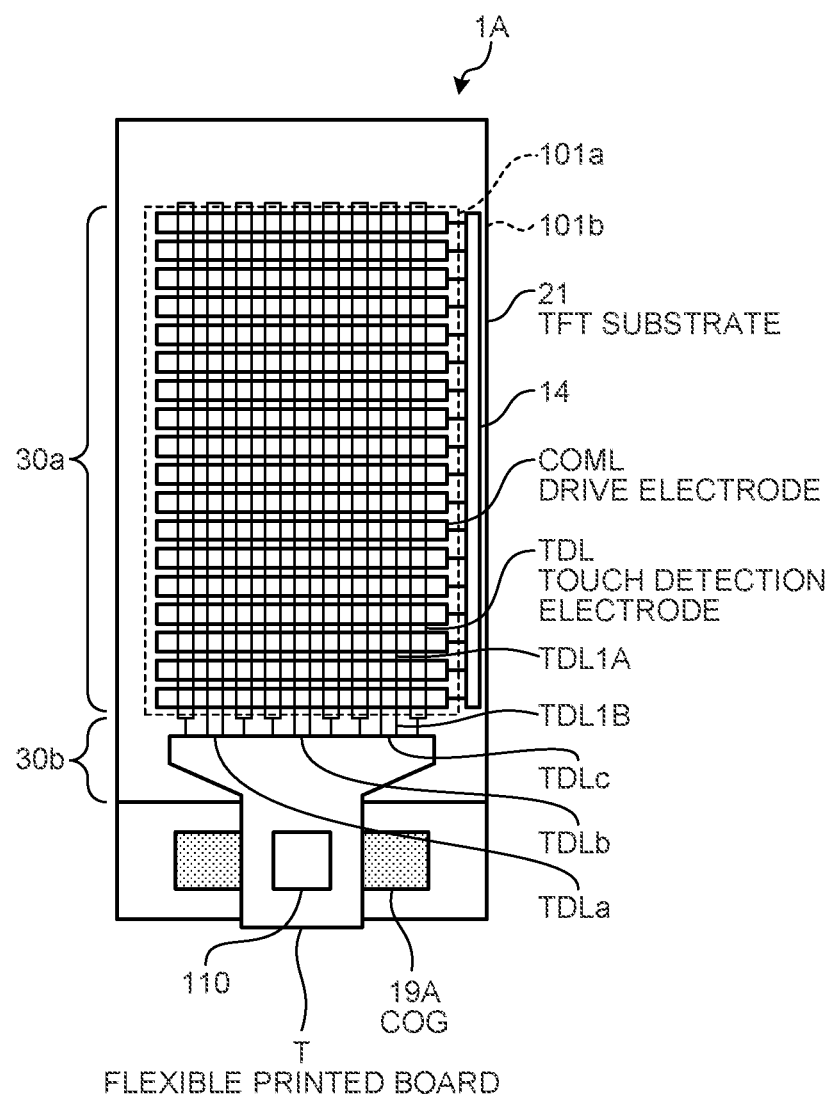
FIG. 23 is a plan view of an exemplary module on which a display device with a touch detection function according to a second embodiment of the present invention is mounted.

FIG. 23 illustrates an exemplary module on which a display device with a touch detection function according to a second embodiment of the present invention is mounted. As illustrated in FIG. 23, the touch detection electrodes TDLa to TDLc arranged at positions corresponding to the buttons 102a to 102c each include the first part TDL1A and the second part TDL1B that extend having the same widths. On the other hand, the touch detection electrodes TDL other than the touch detection electrodes TDLa to TDLc each have a narrower width of the second part TDL1B than that of the first part TDL1A.

A cover member according to the present embodiment is the same as the cover member 120 according to the first embodiment illustrated in FIG. 12. Thus, the 0D touch detection electrodes TDL2a to TDL2c overlap the second parts TDL1B of the touch detection electrodes TDLa to TDLc illustrated in FIG. 23. In the present embodiment, the second parts TDL1B of the touch detection electrodes TDLa to TDLc overlapping the 0D touch detection electrodes TDL2a to TDL2c have widths larger than those of the second parts TDL1B of the touch detection electrodes TDL not overlapping the 0D touch detection electrodes TDL2a to TDL2c.

As described above, since the second parts TDL1B corresponding to the buttons 102a to 102c have large widths, a capacitance between the 0D touch detection electrodes TDL2a to TDL2c and the touch detection electrodes TDLa to TDLc changes when a finger is in contact with or close to the 0D touch detection electrodes TDL2a to TDL2c. Accordingly, the second touch detection signal Vdet2 output from the touch detection electrodes TDL changes, allowing detection of a touch operation on the button part 30b.

Since the second part TDL1B of the touch detection electrodes TDL other than the touch detection electrodes TDLa to TDLc has narrow widths, a capacitance generated between the 0D touch detection electrodes TDL2a to TDL2c and the narrow second parts TDL1B is reduced. Thus, similarly to the results of the self-capacitive touch detection illustrated in FIG. 18, a peak of a capacitance difference is detected at the touch detection electrodes TDLa to TDLc corresponding to the buttons 102a to 102c, whereas the capacitance difference of the touch detection electrodes TDL other than the touch detection electrodes TDLa to TDLc is reduced. This allows simplification of the 0D touch detection electrodes TDL2a to TDL2c and accurate touch detection on the button part 30b.

Third Embodiment

Figure 24:
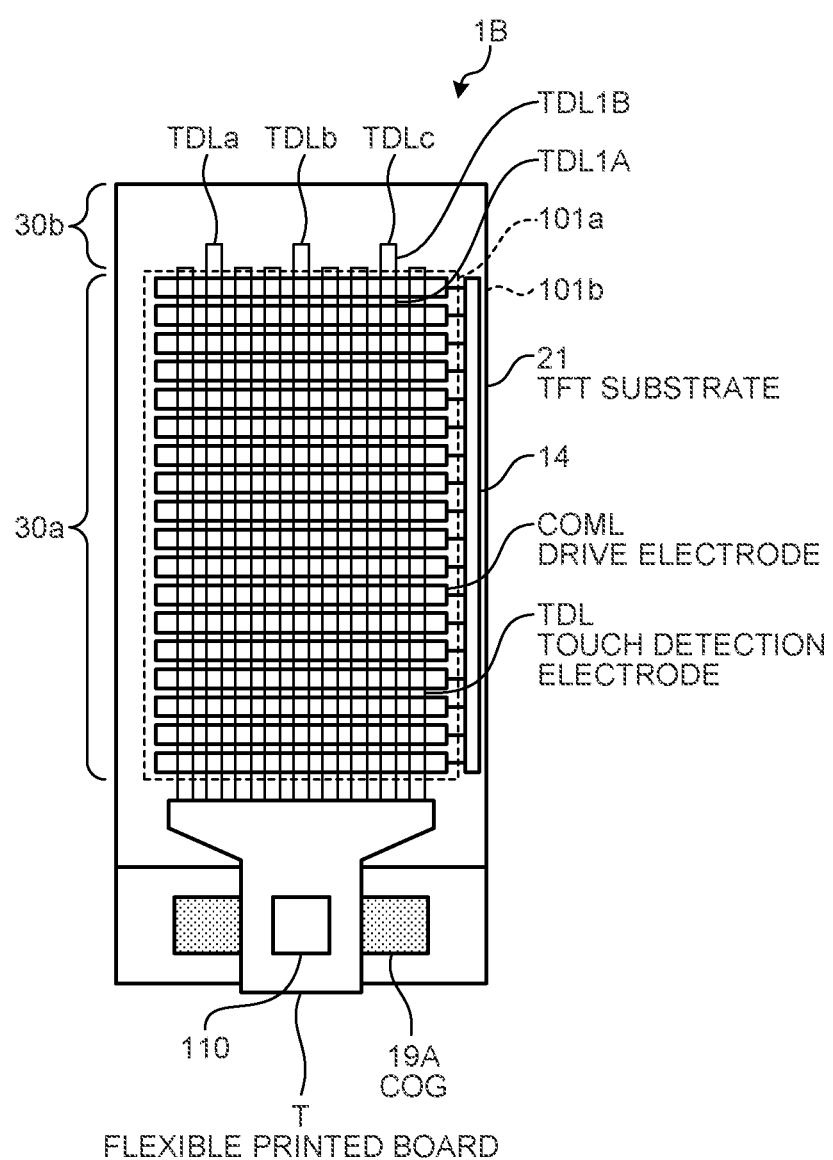
FIG. 24 illustrates an exemplary module on which a display device with a touch detection function according to a third embodiment of the present invention is mounted.
Figure 25:
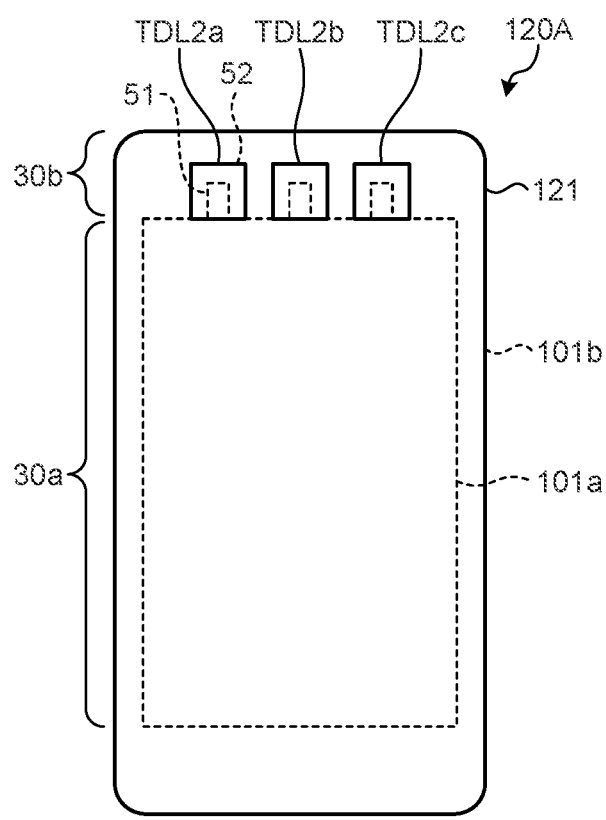
FIG. 25 is a plan view of a cover member of the display device with a touch detection function according to the third embodiment.

FIG. 24 illustrates an exemplary module on which a display device with a touch detection function according to a third embodiment of the present invention is mounted. FIG. 25 is a plan view of a cover member of the display device with a touch detection function according to the third embodiment. As illustrated in FIG. 24, in a display device 1B with a touch detection function according to the third embodiment, the button part 30b is provided at an opposite side to the side where the flexible printed board T is coupled to the touch part 30a. As illustrated in FIG. 25, the 0D touch detection electrodes TDL2a to TDL2c of a cover member 120A are arranged in the button part 30b. In the present embodiment, the buttons 102a to 102c (refer to FIG. 1) are provided in the frame region 101b on the upper side of the display region 101a and respectively face the 0D touch detection electrodes TDL2a to TDL2c.

In this case, the second parts TDL1B of the touch detection electrodes TDLa to TDLc among the touch detection electrodes TDL are provided to overlap the 0D touch detection electrodes TDL2a to TDL2c. In the present embodiment, the touch detection electrodes TDL (the touch detection electrodes TDL other than the touch detection electrodes TDLa to TDLc) arranged at positions not corresponding to the 0D touch detection electrodes TDL2a to TDL2c do not have the second parts TDL1B. Thus, a capacitance is generated between the 0D touch detection electrodes TDL2a to TDL2c and the second parts TDL1B, whereas a capacitance between the touch detection electrodes TDL other than the touch detection electrodes TDLa to TDLc and the 0D touch detection electrodes TDL2a to TDL2c is reduced. Accordingly, as illustrated in FIG. 18, for example, a sharp peak is detected at the touch detection electrode TDL corresponding to any one of the buttons 102a to 102c on which a touch input is performed, thereby improving detection accuracy.

In the present embodiment, the button part 30b is provided opposite to the flexible printed board T, leading to less restrictions on connection of the touch detection electrodes TDL with the flexible printed board T, and a higher freedom in arrangement of the second part TDL1B.

Fourth Embodiment

Figure 26:
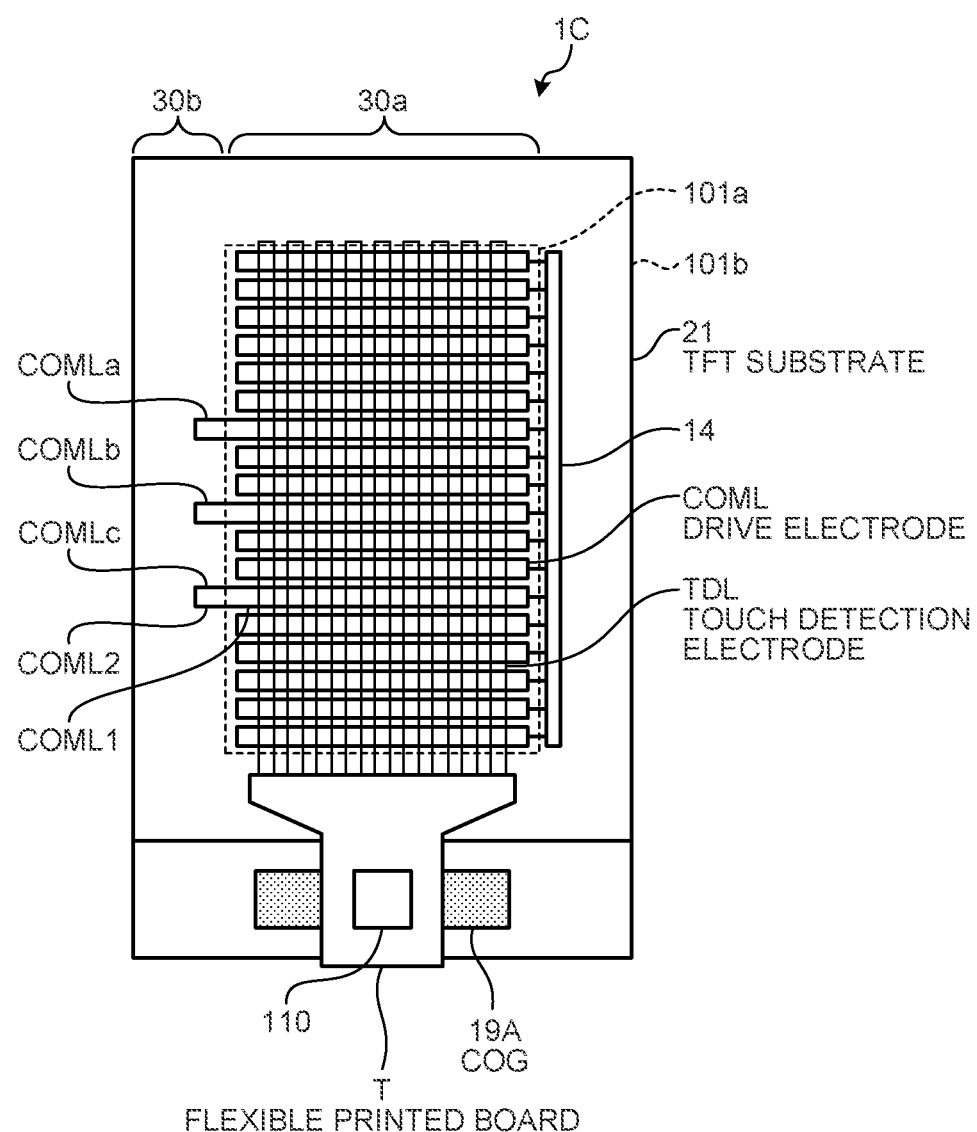
FIG. 26 illustrates an exemplary module on which a display device with a touch detection function according to a fourth embodiment of the present invention is mounted.
Figure 27:
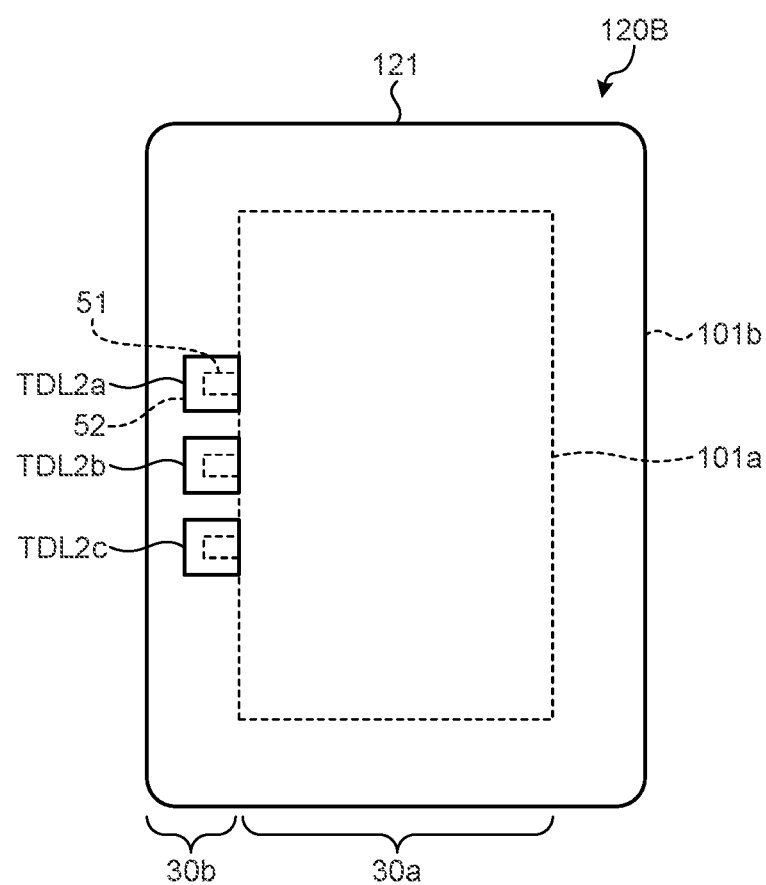
FIG. 27 is a plan view of a cover member of the display device with a touch detection function according to the fourth embodiment.

FIG. 26 illustrates an exemplary module on which a display device with a touch detection function according to a fourth embodiment of the present invention is mounted. FIG. 27 is a plan view of a cover member of the display device with a touch detection function according to the fourth embodiment. In a display device 1C with a touch detection function according to the present embodiment, the button part 30b is provided in the frame region 101b on the left side of the display region 101a as illustrated in FIGS. 26 and 27.

In this case, as illustrated in FIG. 26, drive electrodes COMLa to COMLc among the drive electrodes COML each include a first part COML1 arranged in the touch part 30a and a second part COML2 arranged in the button part 30b adjacent to the touch part 30a. As illustrated in FIG. 27, the 0D touch detection electrodes TDL2a to TDL2c of a cover member 120B are superimposed on the second part COML2 of the drive electrodes COMLa to COMLc. The 0D touch detection electrodes TDL2a to TDL2c each include the overlapping part 51 overlapping the drive electrodes COML and a part not overlapping the drive electrodes COML.

In the present embodiment, the second parts COML2 of the drive electrodes COMLa to COMLc are provided in the button part 30b, and a finger or the like in contact with or close to the button part 30b is detected based on the self-capacitance of the drive electrodes COML.

The operation of the display device 1C with a touch detection function according to the present embodiment is the same as that in the first embodiment described above in the first touch detection period $Pm_n$ (n=1 to N) and the display period $Pd_n$ (n=1 to N) illustrated in FIG. 16, but is different in the second touch detection periods $Ps_1$ and $Ps_1$. Specifically, in the second touch detection periods $Ps_1$ and $Ps_2$, the drive electrode driver 14 supplies the first drive signal Vcom to the drive electrodes COML based on the control signals supplied from the control unit 11. The second touch detection signal Vdet2 output from the drive electrodes COML changes in accordance with the self-capacitance of the drive electrodes COML. The touch detection in the second touch detection periods $Ps_1$ and $Ps_2$ is based on the basic principle of the self-capacitive touch detection illustrated in FIGS. 8 to 10. The drive electrodes COML according to the present embodiment correspond to the touch detection electrode E2 illustrated in FIGS. 8 to 10, and the first drive signal Vcom according to the present embodiment corresponds to the second drive signal Vx illustrated in FIG. 10. The waveform of the second touch detection signal Vdet2 corresponds to the second touch detection signal Vdet2 in illustrated in FIGS. 8 to 10.

The X detection unit 47 (refer to FIG. 2) is coupled to the drive electrodes COML and supplied with the second touch detection signal Vdet2 from the drive electrodes COML. The signal processing unit 44 receives the A/D converted second touch detection signal Vdet2 from the A/D conversion unit 49 and determines whether a finger or the like is in contact with or close to the drive electrodes COML (second parts COML2) in the button part 30b.

With the configuration and through the operation described above, the touch detection on the button part 30b can be performed without problem even when the button part 30b is positioned on the right or left side of the display region 101a (touch part 30a) in a plan view.

In the present embodiment, the first drive signal Vcom is supplied from the drive electrode driver 14 in the second touch detection periods $Ps_1$ and $Ps_2$, but another drive electrode driver may be provided to supply a drive signal.

Fifth Embodiment

Figure 28:
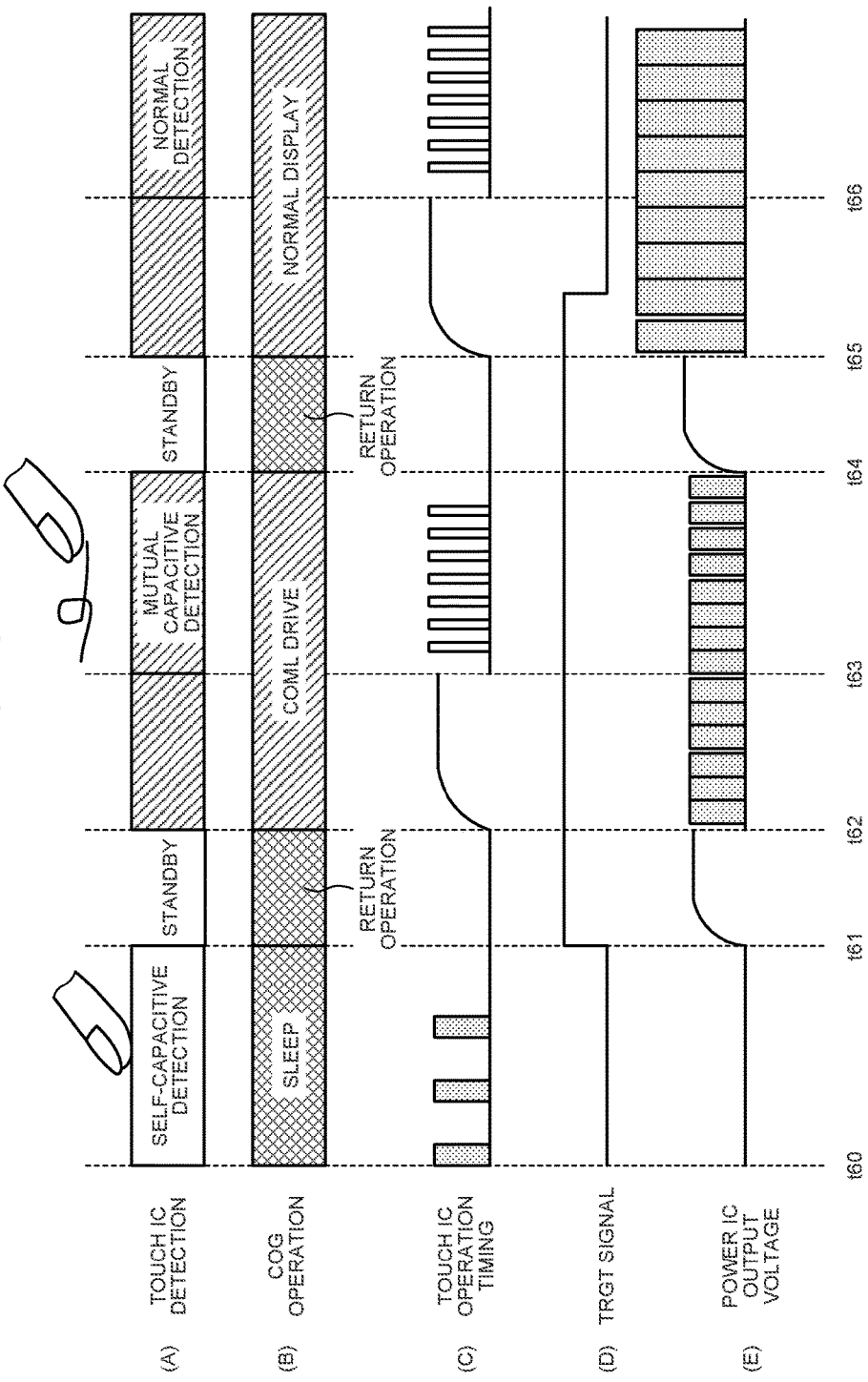
FIG. 28 is an exemplary timing diagram of an operation of a display device with a touch detection function according to a fifth embodiment of the present invention.

FIG. 28 illustrates an exemplary timing diagram of an operation of a display device with a touch detection function according to a fifth embodiment of the present invention. The display device with a touch detection function according to the fifth embodiment has a sleep mode in which 2D touch input detection and image display are not performed to reduce electric power consumption when no operation has been performed for a certain period. FIG. 28(A) illustrates touch detection processing by the touch IC. FIG. 28(B) illustrates an operation of a COG. FIG. 28(C) illustrates operation timing of the touch IC. FIG. 28(D) illustrates a TRGT signal as a control signal output from the touch IC to the COG. FIG. 28(E) illustrates an output voltage of a power IC.

At initial timing t60, the touch IC 110 detects a touch based on the self-capacitance of the touch detection electrodes TDL as illustrated in FIG. 28(A). This COG 19 is in a sleep state, not performing driving of the display unit 10 with a touch detection function, but can receive a control signal from the touch IC 110 as illustrated in FIG. 28(B). The TRGT signal is inactive (low level) as illustrated in FIG. 28(D). The power IC is in a sleep state, not performing voltage boosting, and thus an output voltage is 0V as illustrated in FIG. 28(E).

In the sleep mode, the touch IC 110 can detect any touch input on the touch part 30a or the button part 30b based on the self-capacitance of the touch detection electrodes TDL at a predetermined interval as illustrated in FIG. 28(C). Thus, the display device 1 with a touch detection function may use, for example, a 0D button touch input as a trigger for shifting the smartphone 100 from the sleep mode to a normal operation mode, thereby reducing electric power consumption and improving operability of the smartphone 100. In this sleep mode, the mutual capacitive touch detection operation and the image display operation are not executed.

Having detected a touch, the touch IC 110 activates the TRGT signal (high level) at timing t61. The TRGT signal is transmitted from the touch IC 110 to the COG 19. The COG 19 transmits a control signal to the power IC when the TRGT signal is activated at timing t61 to return the power IC from the sleep state. The power IC supplies a power voltage Vcc to the COG 19 at timing t62.

At timing t63, the touch IC 110 detects a gesture based on a mutual capacitance between the touch detection electrodes TDL and the drive electrodes COML at a predetermined interval. Having detected a predetermined gesture, the touch IC 110 transmits a sleep cancel command to the COG 19 at timing t64.

Having received the sleep cancel command, at timing t64, the COG 19 outputs a control signal to the power IC, which causes the power IC to output a power voltage Vdd. The power IC supplies the power voltage Vdd to the COG 19 at timing t65. At this timing, the COG 19 starts a backlight operation. This allows the display device 1 with a touch detection function to perform image display.

The COG 19 starts driving of the display unit 10 with a touch detection function, i.e., driving of the drive electrodes COML for image display and touch detection by using the power voltage Vdd supplied from the power IC at timing t65. The touch IC 110 detects a gesture based on the mutual capacitance between the touch detection electrodes TDL and the drive electrodes COML at a predetermined interval at timing t66 at which a predetermined time has passed since timing t65.

In this manner, the display device 1 with a touch detection function returns from the sleep mode to the normal operation mode. If no touch input has been detected for a predetermined time in the normal operation mode, the COG 19 puts the power IC into the sleep mode (stops voltage boosting thereof).

Sixth Embodiment

Figure 29:
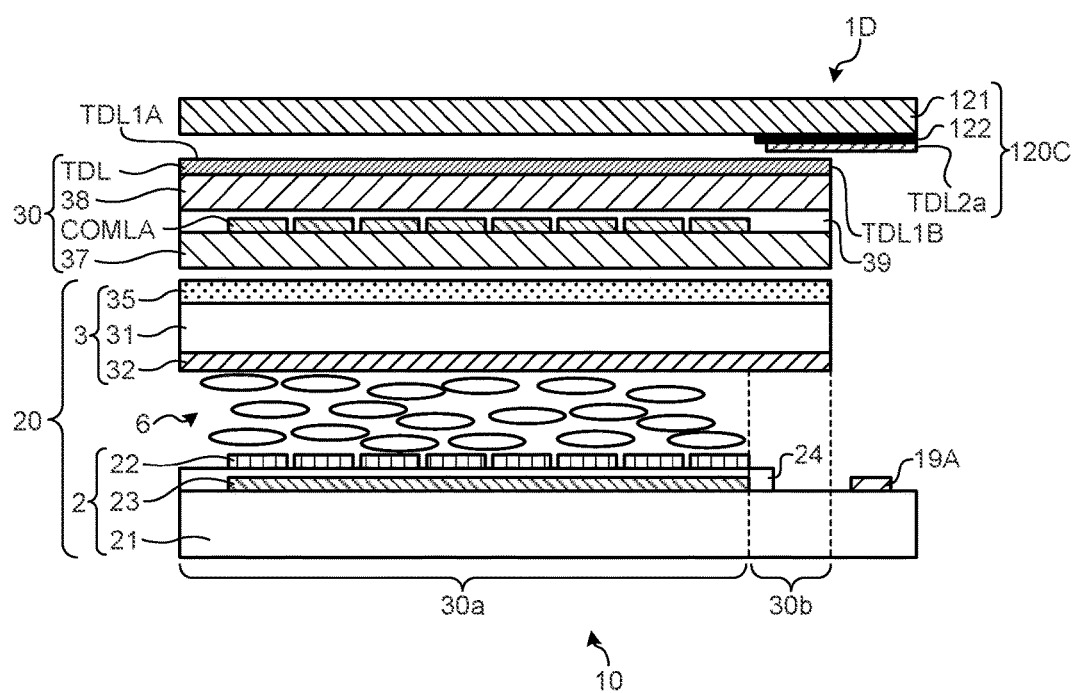
FIG. 29 is a sectional view of a schematic sectional structure of a display device with a touch detection function according to a sixth embodiment of the present invention.

FIG. 29 is a sectional view of a schematic sectional structure of a display device with a touch detection function according to a sixth embodiment of the present invention. A so-called in-cell device in which the display panel 20 and the touch panel 30 are integrated with each other has been described above in the first to the fifth embodiments, but the present invention is not limited thereto. As illustrated in FIG. 29, a display device 1D with a touch detection function according to the present embodiment is a so-called on-cell device in which the touch panel 30 serving as a touch detection device that detects a touch input is mounted on the display panel 20.

In the display panel 20, a plurality of pixel electrodes 22 and common electrodes 23 are provided above the TFT substrate 21. The common electrodes 23 face the pixel electrodes 22 in the direction vertical to the surface of the TFT substrate 21.

The touch panel 30 includes drive electrodes COMLA provided on a lower substrate 37 and touch detection electrodes TDL provided on an upper substrate 38. An insulating layer 39 is provided on the upper surface of the drive electrodes COMLA. Each of the drive electrodes COMLA is supplied with the first drive signal Vcom for detecting a touch input on the touch part 30a. The touch detection electrodes TDL each include the first part TDL1A extending in the touch part 30a and the second part TDL1B extending in the button part 30b. The first part TDL1A faces the drive electrodes COMLA, and the second part TDL1B faces the 0D touch detection electrodes TDL2a to TDL2c provided to the cover glass 121 of a cover member 120C (in FIG. 29, the 0D touch detection electrode TDL2a is illustrated).

In the present embodiment, the drive electrodes COMLA to which the first drive signals Vcom are supplied and the common electrodes 23 for applying common electric potential to the pixel electrodes 22 are separately provided. Even with such a configuration, it is possible to detect a touch input on the touch part 30a of the touch panel 30 based on a mutual capacitance, and a touch input on the button part 30b based on a self-capacitance, as described above.

While the present invention has been described with reference to the exemplary embodiments, the invention is not limited to the disclosed exemplary embodiments. The contents disclosed in the embodiments are merely exemplary, and various kinds of modifications can be made without departing from the scope of the present invention. Appropriate modifications that are made without departing from the scope of the present invention naturally fall within the technical scope of the present invention.

For example, the touch detection electrodes TDL and the drive electrodes COML are not limited to the shapes and the arrangements illustrated in FIG. 11 or the like, and a configuration in which a plurality of rectangular electrodes are arranged may be employed, for example. The touch detection electrodes TDL and the drive electrodes COML may be provided on the same plane. The cover glass 121 may not be provided with the 0D touch detection electrodes TDL2a to TDL2c. The shapes, arrangements, and the like of the 0D touch detection electrodes TDL2a to TDL2c may be changed as appropriate.

What is claimed is:

1. A touch detection device comprising:
   a substrate;
   a plurality of drive electrodes arranged on a plane parallel to the substrate and in a first region in which an image is displayed; and
   a plurality of touch detection electrodes configured to generate a capacitance between the touch detection electrodes and the drive electrodes, wherein
   the touch detection electrodes include a first part arranged in the first region and a second part arranged in a second region adjacent to the first region,
   the drive electrodes are sequentially supplied with a first drive signal to detect a conducting body in contact with or close to the first region in a first touch detection mode, and
   the touch detection electrodes are supplied with a second drive signal to detect a conducting body in contact with or close to the second region in a second touch detection mode; and
   an overlapping electrode that overlaps the second part of the touch detection electrodes in a direction perpendicular to a surface of the substrate.

2. The touch detection device according to claim 1, wherein
   the touch detection electrodes each have the second part, and
   the second parts each include a first portion that overlaps the overlapping electrode and a second portion that does not overlap the overlapping electrode.

3. The touch detection device according to claim 2, wherein
   the second parts are arranged at a predetermined pitch in a first direction intersecting a second direction in which the touch detection electrodes extend, and
   the overlapping electrodes are arranged at a pitch larger than the pitch of the second parts in the first direction.

4. The touch detection device according to claim 2, wherein the first portion of the second part has a width larger than a width of the second portion of the second part.

5. The touch detection device according to claim 1, wherein the overlapping electrode includes an overlapping part that overlaps the at least one touch detection electrode and a non-overlapping part that does not overlap the touch detection electrodes.

6. The touch detection device according to claim 1, wherein the overlapping electrode is arranged at a position farther from the surface of the substrate than the touch detection electrodes in the perpendicular direction.

7. The touch detection device according to claim 1, further comprising a cover substrate facing the substrate in the perpendicular direction, wherein
   the cover substrate is provided with the overlapping electrode.

8. The touch detection device according to claim 1, wherein
   the touch detection electrodes output a first touch detection signal in the first touch detection mode,
   the touch detection electrodes output a second touch detection signal in the second touch detection mode, and
   a conducting body in contact with or close to the second region is detected based on a difference between the first touch detection signal and the second touch detection signal.

9. The touch detection device according to claim 1, wherein
   the touch detection electrodes output a first touch detection signal in the first touch detection mode, the touch detection electrodes output a second touch detection signal in the second touch detection mode, and a conducting body in contact with or close to the second region is detected based on a difference between the second touch detection signals output from the touch detection electrodes.

10. The touch detection device according to claim 1, wherein a conducting body in contact with or close to the touch detection electrodes in the first region is detected based on a mutual capacitance between the touch detection electrodes and the drive electrodes in the first touch detection mode, and a conducting body in contact with or close to the second region is detected based on a self-capacitance of the touch detection electrodes in the second touch detection mode.

11. The touch detection device according to claim 1, wherein the touch detection electrodes detect a conducting body in contact with or close to the second region based on a capacitance between the overlapping electrode and the at least one touch detection electrode that overlaps the overlapping electrode in the second touch detection mode.

12. A cover member arranged on a surface of a touch detection device including a substrate, a plurality of drive electrodes arranged on a plane parallel to the substrate and in a first region in which an image is displayed, and a plurality of touch detection electrodes configured to generate a capacitance between the touch detection electrodes and the drive electrodes, the touch detection electrodes including a first part arranged in the first region and a second part arranged in a second region adjacent to the first region, the drive electrodes are sequentially supplied with a first drive signal to detect a conducting body in contact with or close to the first region in a first touch detection mode, and the touch detection electrodes are supplied with a second drive signal to detect a conducting body in contact with or close to the second region in a second touch detection mode, the cover member comprising:

a cover substrate; and an overlapping electrode arranged at a position of the second part of the touch detection electrodes in a plan view on a plane parallel to the cover substrate.

* * * * *